(12) United States Patent
Yamashita et al.

(10) Patent No.: US 12,186,843 B2
(45) Date of Patent: Jan. 7, 2025

(54) FASTENING TOOL

(71) Applicant: MAX CO., LTD., Tokyo (JP)

(72) Inventors: Michio Yamashita, Tokyo (JP); Yusuke Osawa, Tokyo (JP); Kazuya Takeuchi, Tokyo (JP)

(73) Assignee: Max Co., Ltd., Tokyo (JP)

( * ) Notice: Subject to any disclaimer, the term of this patent is extended or adjusted under 35 U.S.C. 154(b) by 261 days.

(21) Appl. No.: 17/686,981

(22) Filed: Mar. 4, 2022

(65) Prior Publication Data

US 2022/0281079 A1 Sep. 8, 2022

(30) Foreign Application Priority Data

| Mar. 4, 2021 | (JP) | ................................ | 2021-034722 |
| Mar. 4, 2021 | (JP) | ................................ | 2021-034723 |
| Mar. 4, 2021 | (JP) | ................................ | 2021-034724 |
| Mar. 4, 2021 | (JP) | ................................ | 2021-034725 |
| Sep. 14, 2021 | (JP) | ................................ | 2021-149653 |
| Sep. 14, 2021 | (JP) | ................................ | 2021-149654 |

(51) Int. Cl.
| *B25B 21/00* | (2006.01) |
| *B23B 31/12* | (2006.01) |
| *B23P 19/06* | (2006.01) |
| *B25B 21/02* | (2006.01) |
| *B25B 23/00* | (2006.01) |
| *B25B 27/00* | (2006.01) |

(Continued)

(52) U.S. Cl.
CPC .............. *B23P 19/06* (2013.01); *B23B 31/12* (2013.01); *B25B 21/00* (2013.01); *B25B 21/02* (2013.01); *B25B 21/023* (2013.01); *B25B 23/0064* (2013.01); *B25B 27/0085* (2013.01); *B25F 5/02* (2013.01); *B25B 23/06* (2013.01)

(58) Field of Classification Search
CPC ..... B25B 21/02; B25B 21/002; B25B 21/023; B25B 21/00; B25B 27/0085; B25B 23/045; B25B 23/0064; B25B 23/06; B23B 31/12; B25F 5/02; B23P 19/06
See application file for complete search history.

(56) References Cited

U.S. PATENT DOCUMENTS

| 3,688,966 A | 9/1972 | Garry et al. |
| 3,708,097 A | 1/1973 | Fisher |

(Continued)

FOREIGN PATENT DOCUMENTS

| CA | 2978391 A1 | 3/2019 |
| CN | 104972438 A | 10/2015 |

(Continued)

OTHER PUBLICATIONS

U.S. Appl. No. 17/686,981, filed Mar. 4, 2022, Fastening Tool, Michio Yamashita Yusuke Osawa Kazuya Takeuchi.

(Continued)

*Primary Examiner* — Thomas M Wittenschlaeger
(74) *Attorney, Agent, or Firm* — Banner & Witcoff, Ltd.

(57) ABSTRACT

A fastening tool including a bit holding unit configured to hold a driver bit so as to be rotatable and to be movable in an axis direction, a first drive unit having a first motor configured to rotate the driver bit held by the bit holding unit, and a second drive unit having a second motor configured to move the driver bit held by the bit holding unit along the axis direction.

10 Claims, 26 Drawing Sheets

(51) Int. Cl.
*B25F 5/02* (2006.01)
*B25B 23/06* (2006.01)

(56) References Cited

U.S. PATENT DOCUMENTS

| | | | |
|---|---|---|---|
| 3,971,421 A | 7/1976 | Damratowski | |
| 4,367,837 A | 1/1983 | Manino | |
| 4,517,863 A | 5/1985 | Ishikawa | |
| 4,581,964 A | 4/1986 | Takatsuru | |
| 4,821,937 A | 4/1989 | Rafferty | |
| 4,976,173 A * | 12/1990 | Yang | B25F 3/00 81/177.8 |
| 5,027,679 A | 7/1991 | Kawashima et al. | |
| 5,144,870 A | 9/1992 | Nick | |
| 5,186,085 A | 2/1993 | Monacelli | |
| 5,346,453 A | 9/1994 | Rivera-Bottzeck | |
| 5,425,293 A | 6/1995 | Nakazato et al. | |
| 5,469,924 A | 11/1995 | Kanamori et al. | |
| 5,549,169 A | 8/1996 | Matsumura et al. | |
| 5,890,405 A * | 4/1999 | Becker | B25B 23/147 81/434 |
| 5,921,156 A | 7/1999 | Takezaki et al. | |
| 5,931,366 A | 8/1999 | Muro | |
| 5,996,874 A | 12/1999 | Fukushima et al. | |
| 6,061,901 A | 5/2000 | Tanaka | |
| 6,096,042 A | 8/2000 | Herbert | |
| 6,655,573 B1 | 12/2003 | Chang et al. | |
| 6,915,724 B2 | 7/2005 | Kigel et al. | |
| 7,055,728 B2 | 6/2006 | Lin | |
| 7,150,384 B2 | 12/2006 | Yasuike et al. | |
| 7,225,962 B2 | 6/2007 | Porth et al. | |
| 7,802,500 B2 | 9/2010 | Kolodziej et al. | |
| 7,866,236 B2 | 1/2011 | Hsu | |
| 8,371,489 B2 | 2/2013 | Ogawa et al. | |
| 8,490,516 B2 | 7/2013 | Baba et al. | |
| 8,701,956 B2 | 4/2014 | Takemura et al. | |
| 9,789,596 B2 | 10/2017 | Moriwaki et al. | |
| 10,820,911 B2 | 11/2020 | Delman et al. | |
| 2003/0154824 A1 | 8/2003 | Wakabayashi et al. | |
| 2004/0006861 A1 | 1/2004 | Haytayan | |
| 2005/0279517 A1 | 12/2005 | Hoffman et al. | |
| 2007/0108250 A1 | 5/2007 | Odoni et al. | |
| 2007/0246502 A1 | 10/2007 | Liu et al. | |
| 2008/0105725 A1 | 5/2008 | Tamura et al. | |
| 2011/0073336 A1 | 3/2011 | Baba et al. | |
| 2011/0245833 A1 | 10/2011 | Anderson | |
| 2011/0303721 A1 | 12/2011 | Miescher et al. | |
| 2012/0153003 A1 | 6/2012 | Dittrich | |
| 2013/0255447 A1 | 10/2013 | Po | |
| 2013/0255984 A1 | 10/2013 | Po | |
| 2013/0284788 A1 | 10/2013 | Gerold et al. | |
| 2015/0080966 A1* | 3/2015 | Anderson | B25B 23/0064 606/280 |
| 2015/0306752 A1 | 10/2015 | Shen et al. | |
| 2015/0336224 A1 | 11/2015 | Liu et al. | |
| 2018/0093367 A1 | 4/2018 | Andriolo et al. | |
| 2018/0207759 A1 | 7/2018 | Gray | |
| 2019/0099872 A1 | 4/2019 | Tanaka | |
| 2019/0118361 A1 | 4/2019 | Takeuchi et al. | |
| 2020/0100799 A1* | 4/2020 | Delman | A61B 90/50 |
| 2020/0298382 A1 | 9/2020 | Clark | |
| 2020/0306941 A1 | 10/2020 | Akiba et al. | |
| 2021/0146489 A1 | 5/2021 | Ogata et al. | |
| 2022/0126409 A1* | 4/2022 | Sugioka | B23P 19/06 |

FOREIGN PATENT DOCUMENTS

| | | |
|---|---|---|
| CN | 107914242 A | 4/2018 |
| CN | 110576405 A | 12/2019 |
| DE | 3930999 A1 | 3/1991 |
| EP | 2218552 A2 | 8/2010 |
| JP | S63-300830 A | 12/1988 |
| JP | UM-H03-047781 A | 5/1991 |
| JP | H06-262453 A | 9/1994 |
| JP | H06-312382 A | 11/1994 |
| JP | H07-241780 A | 9/1995 |
| JP | H07-266246 A | 10/1995 |
| JP | H10-235572 A | 9/1998 |
| JP | 2000-516109 A | 12/2000 |
| JP | 2002-346947 A | 12/2002 |
| JP | 5262461 B2 | 8/2013 |
| JP | 5590505 B2 | 9/2014 |
| JP | 2015-066661 A | 4/2015 |
| JP | 2016221595 A | 12/2016 |
| JP | 6197547 B2 | 9/2017 |
| JP | 6479248 B1 | 3/2019 |
| JP | 2019-076979 A | 5/2019 |
| JP | 2020-006452 A | 1/2020 |
| WO | 95/05261 A1 | 2/1995 |
| WO | 98-010900 A2 | 3/1998 |
| WO | 2020009159 A1 | 1/2020 |

OTHER PUBLICATIONS

U.S. Appl. No. 17/687,033, filed Mar. 4, 2022, Fastening Tool, Michio Yamashita Yusuke Osawa Kazuya Takeuchi.
U.S. Appl. No. 17/687,099, filed Mar. 4, 2022, Fastening Tool, Michio Yamashita Yusuke Osawa Kazuya Takeuchi.
U.S. Appl. No. 17/687,365, filed Mar. 4, 2022, Fastening Tool, Michio Yamashita Yusuke Osawa Kazuya Takeuchi.
U.S. Appl. No. 17/687,447, filed Mar. 4, 2022, Fastening Tool, Michio Yamashita Yusuke Osawa Kazuya Takeuchi.
U.S. Appl. No. 17/687,206, filed Mar. 4, 2022, Fastening Tool, Michio Yamashita Yusuke Osawa Kazuya Takeuchi.
Extended European Search Report dated Aug. 1, 2022, issued by the European Patent Office in the corresponding European Patent Application No. 22160123.0. (9 pages).
Extended European Search Report dated Aug. 1, 2022, issued by the European Patent Office in the corresponding European Patent Application No. 22160125.5. (9 pages).
Extended European Search Report dated Aug. 1, 2022, issued by the European Patent Office in the corresponding European Patent Application No. 22160119.8. (9 pages).
Extended European Search Report dated Aug. 1, 2022, issued by the European Patent Office in the corresponding European Patent Application No. 22160134.7. (10 pages).
Extended European Search Report dated Aug. 1, 2022, issued by the European Patent Office in the corresponding European Patent Application No. 22160138.8. (8 pages).
Mar. 8, 2024—(US)—Non-final Office Action—U.S. Appl. No. 17/687,365.
Extended European Search Report dated Nov. 23, 2022, issued by the European Patent Office in the corresponding European Patent Application No. 22160121.4. (8 pages).
Jun. 24, 2024 (EP) Search Report—App 24166431.7.
Jun. 12, 2024—(US)—Non-final Office Action—U.S. Appl. No. 17/687,099.
Apr. 11, 2024—(US)—Non-final Office Action—U.S. Appl. No. 17/687,033.
Apr. 15, 2024—(US)—Non-final Office Action—U.S. Appl. No. 17/687,447.
Aug. 5, 2024—(US)—Notice of Allowance—U.S. Appl. No. 17/687,206.
Aug. 5, 2024—(US)—Notice of Allowance—U.S. Appl. No. 17/687,447.
Aug. 3, 20240—(US)—Final Office Action—U.S. Appl. No. 17/687,365.
Nov. 15, 2024—(US)—Final Office Action—U.S. Appl. No. 17/687,033.

* cited by examiner

FASTENING TOOL

CROSS-REFERENCE TO RELATED APPLICATION(S)

This application is based on and claims priority under 35 USC 119 from Japanese Patent Application No. 2021-034722 filed on Mar. 4, 2021, Japanese Patent Application No. 2021-034723 filed on Mar. 4, 2021, Japanese Patent Application No. 2021-034724 filed on Mar. 4, 2021, Japanese Patent Application No. 2021-034725 filed on Mar. 4, 2021, Japanese Patent Application No. 2021-149653 filed on Sep. 14, 2021, and Japanese Patent Application No. 2021-149654 filed on Sep. 14, 2021, the contents of which are incorporated herein by reference and priority is claimed to each.

TECHNICAL FIELD

The present invention relates to a fastening tool configured to engage a driver bit with a screw, to push and press the screw against a fastening target with the driver bit, and to rotate the driver bit for screwing.

BACKGROUND ART

Known is a tool called a portable striking machine configured to strike out connected stoppers loaded in a magazine sequentially from a tip end of a driver guide by using an air pressure of a compressed air supplied from an air compressor or a combustion pressure of a gas.

As a striking machine configured to use a combustion pressure of a gas, there is a cordless striking machine where a small gas cylinder is mounted on a striking machine body, and a screw striking machine configured to use screws as connected stoppers to be struck is suggested (for example, refer to PTL 1).

In addition, suggested is a screw striking machine configured to compress a spring by a drive force of a motor configured to rotate a screw, and to strike the screw by urging of the spring (for example, refer to PTL 2).

CITATION LIST

Patent Document

PTL 1: Japanese Patent No. 5,590,505
PTL 2: Japanese Patent No. 6,197,547

The screw striking machine configured to use a combustion pressure of a gas requires both a battery and a gas cylinder. In addition, in the screw striking machine configured to strike a screw by urging of the spring, it is difficult to adjust excess or deficiency in screw striking force.

SUMMARY

The present invention has been made to solve such problems, and an object of the present invention is to provide a fastening tool configured to press a screw against a fastening target by a drive force of a motor.

In order to solve the above-described problems, the present invention provides a fastening tool including a bit holding unit configured to hold a driver bit so as to be rotatable and to be movable in an axis direction, and a motor configured to move the driver bit held by the bit holding unit along the axis direction in which a screw engaged with the driver bit is pressed against a fastening target.

In addition, the present invention provides a fastening tool including a bit holding unit configured to hold a driver bit so as to be rotatable and to be movable in an axis direction, a first drive unit having a first motor configured to rotate the driver bit held by the bit holding unit, and a second drive unit having a second motor configured to move the driver bit held by the bit holding unit along the axis direction.

DESCRIPTION OF EMBODIMENTS

Hereinafter, embodiments of the fastening tool of the present invention will be described with reference to the drawings.

Configuration Example of Fastening Tool of Present Embodiment

Figure 1:
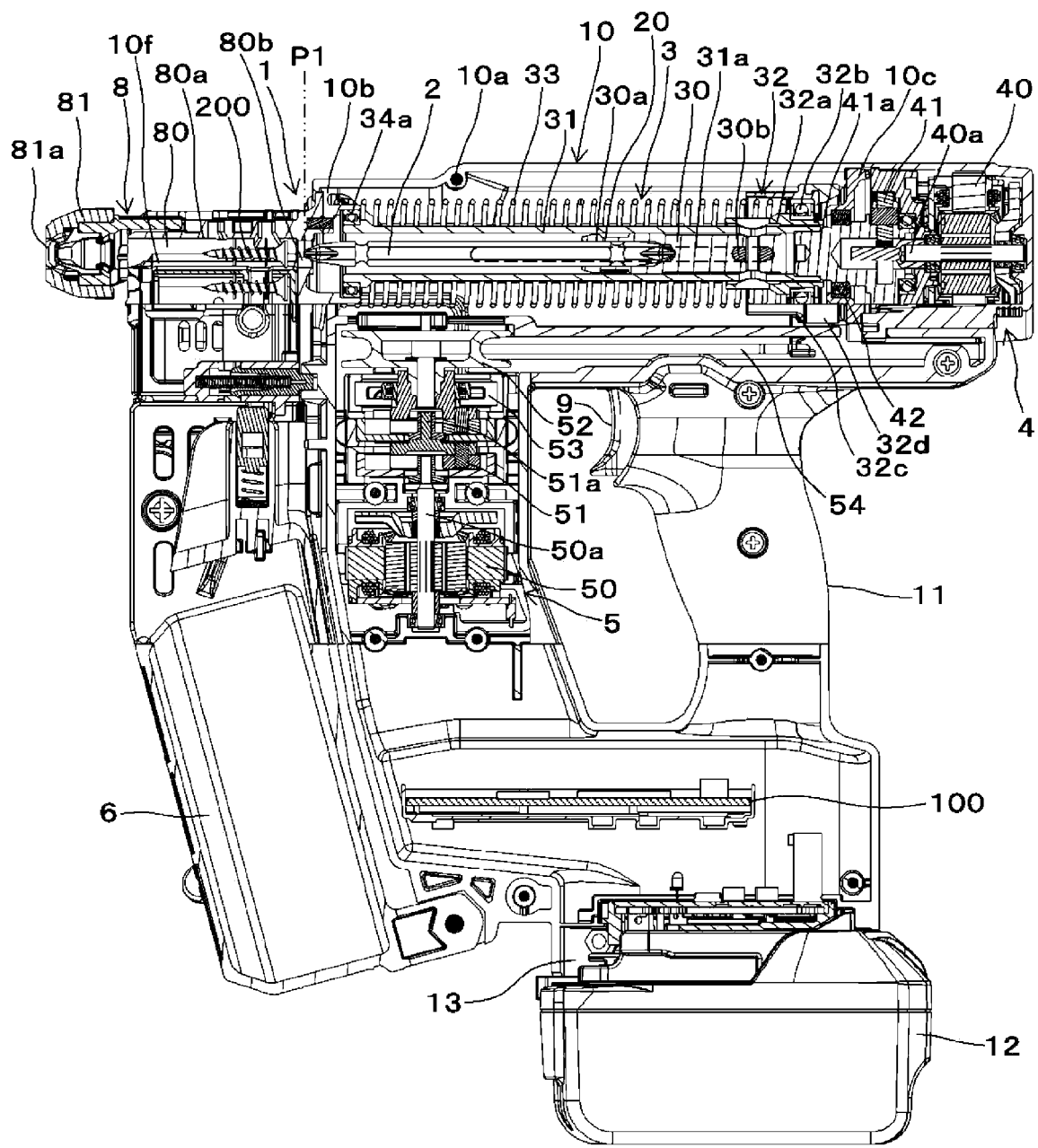
FIG. 1 is a side cross-sectional view showing an example of an internal structure of a fastening tool according to the present embodiment.
Figure 2A:
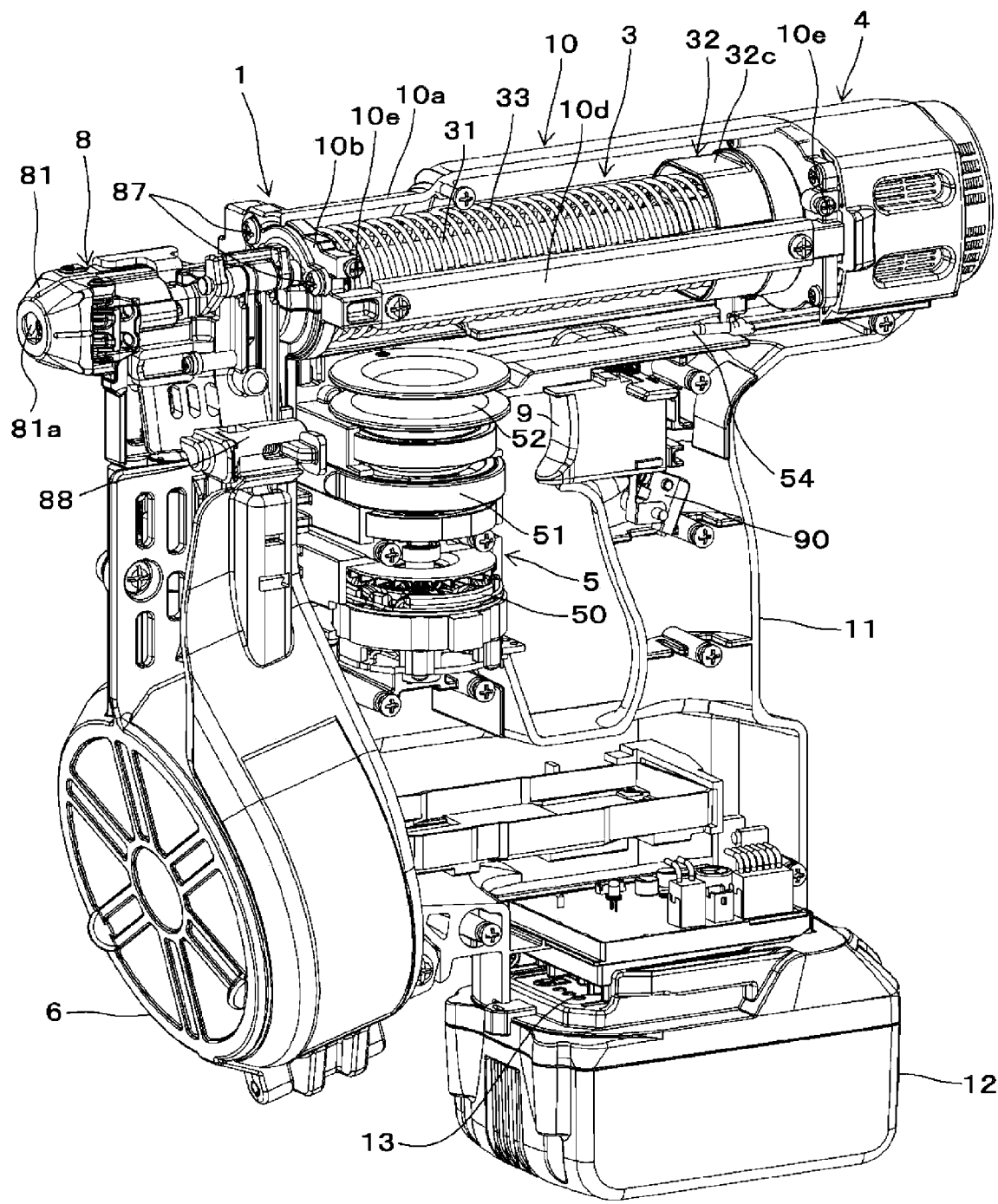
FIG. 2A is a partially broken perspective view showing the example of the internal structure of the fastening tool according to the present embodiment.
Figure 2B:
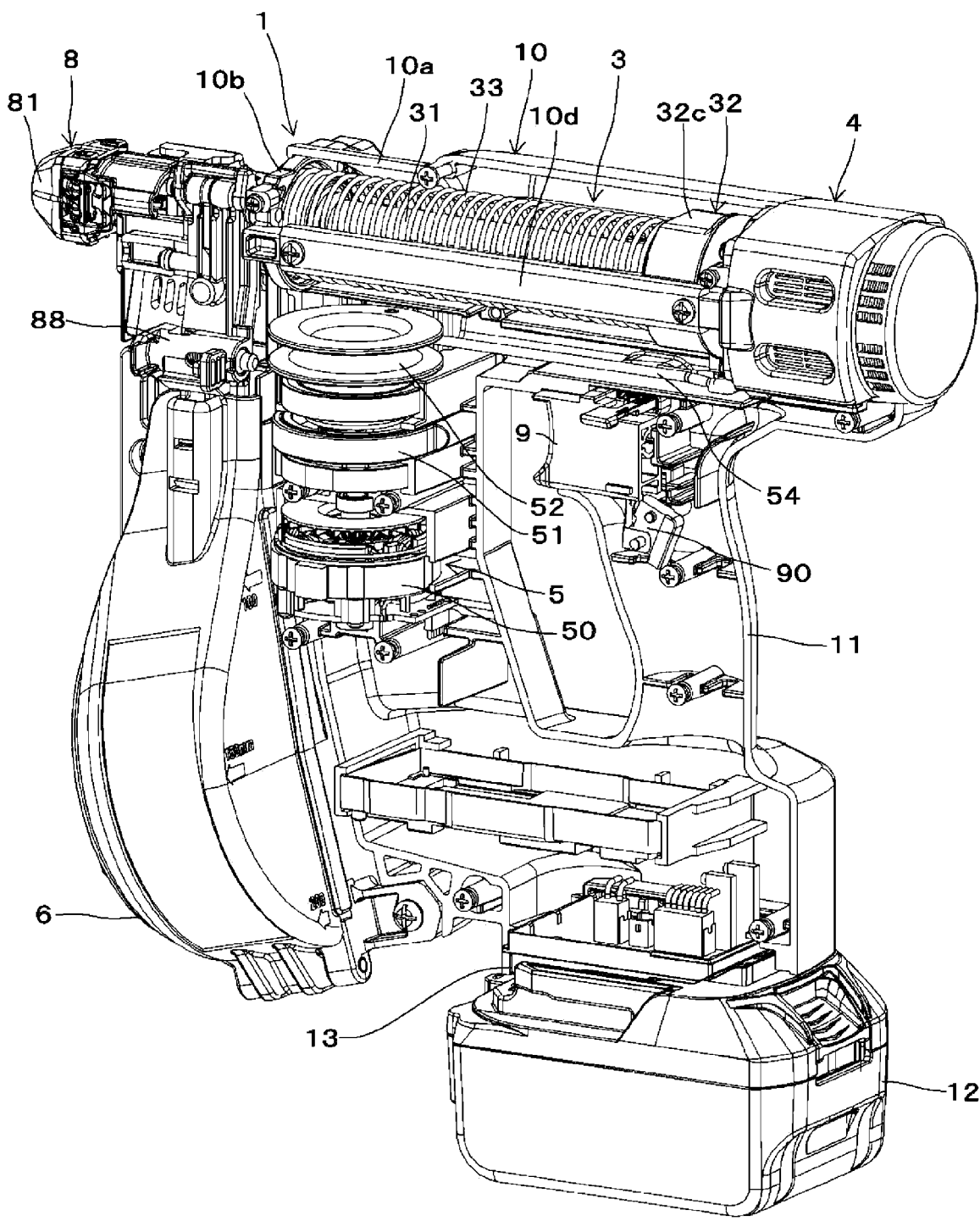
FIG. 2B is a partially broken perspective view showing the example of the internal structure of the fastening tool according to the present embodiment.
Figure 2C:
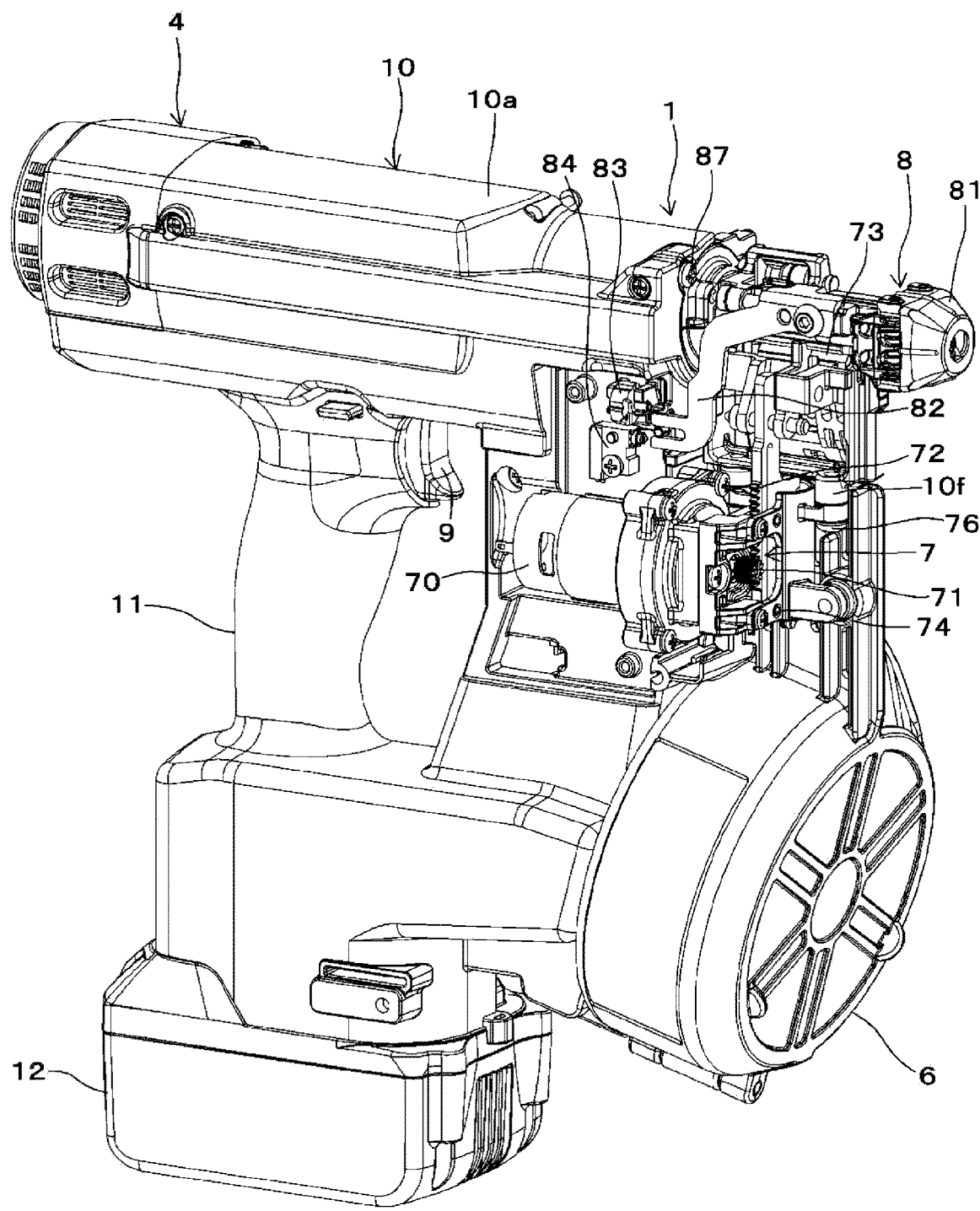
FIG. 2C is a partially broken perspective view showing the example of the internal structure of the fastening tool according to the present embodiment.
Figure 3A:
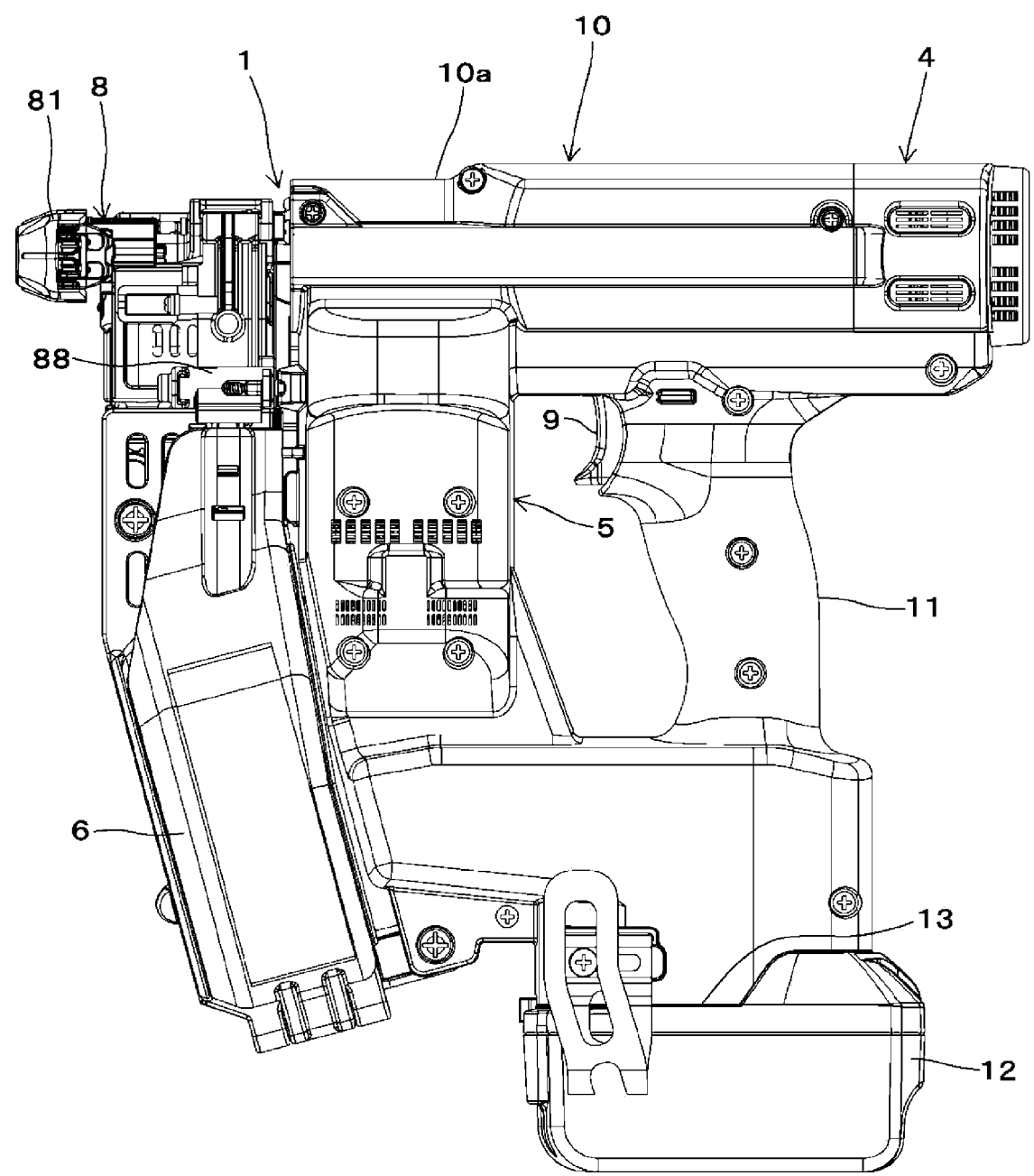
FIG. 3A is a side view showing the example of the fastening tool according to the present embodiment.
Figure 3B:
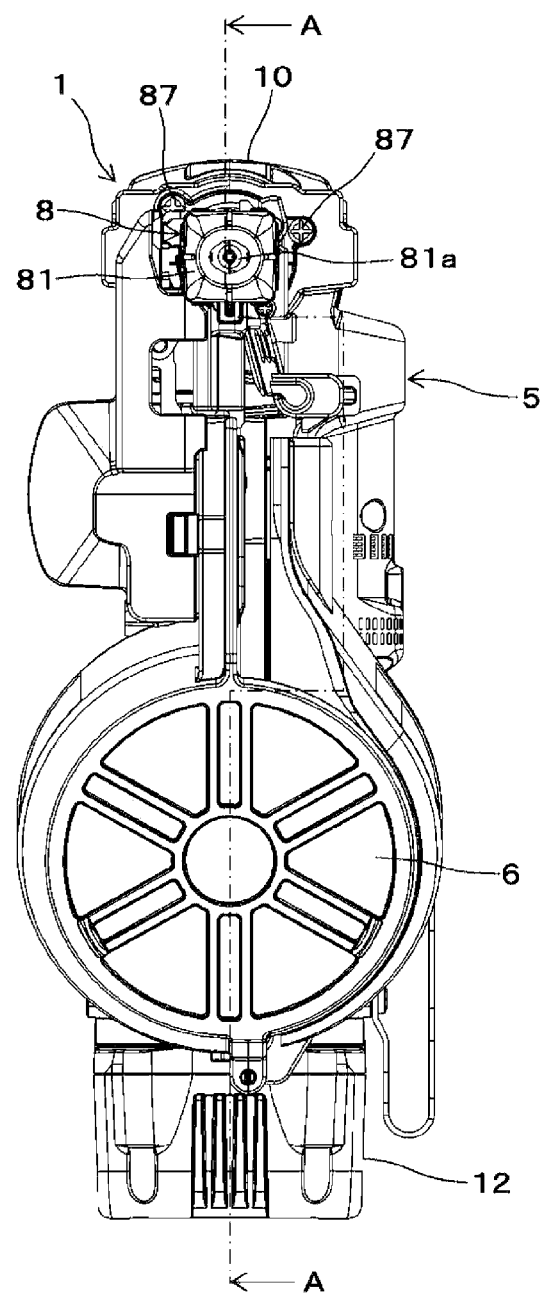
FIG. 3B is a front view showing the example of the fastening tool according to the present embodiment.
Figure 3C:
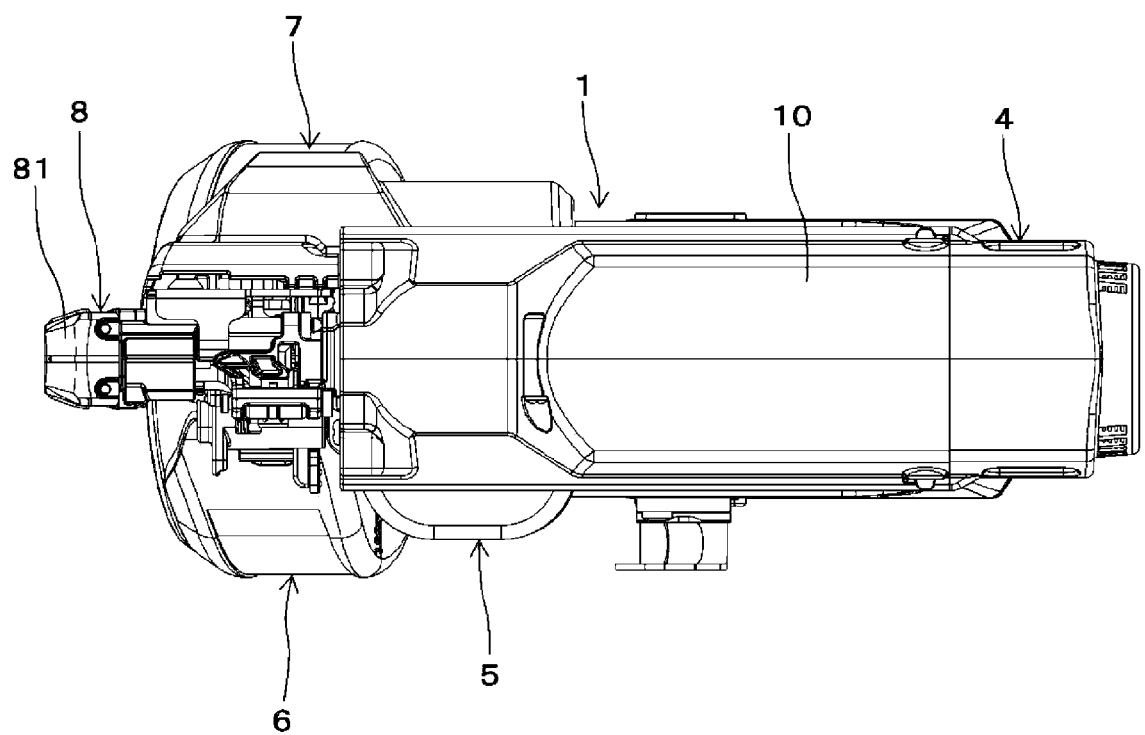
FIG. 3C is a top view showing the example of the fastening tool according to the present embodiment.
Figure 4A:
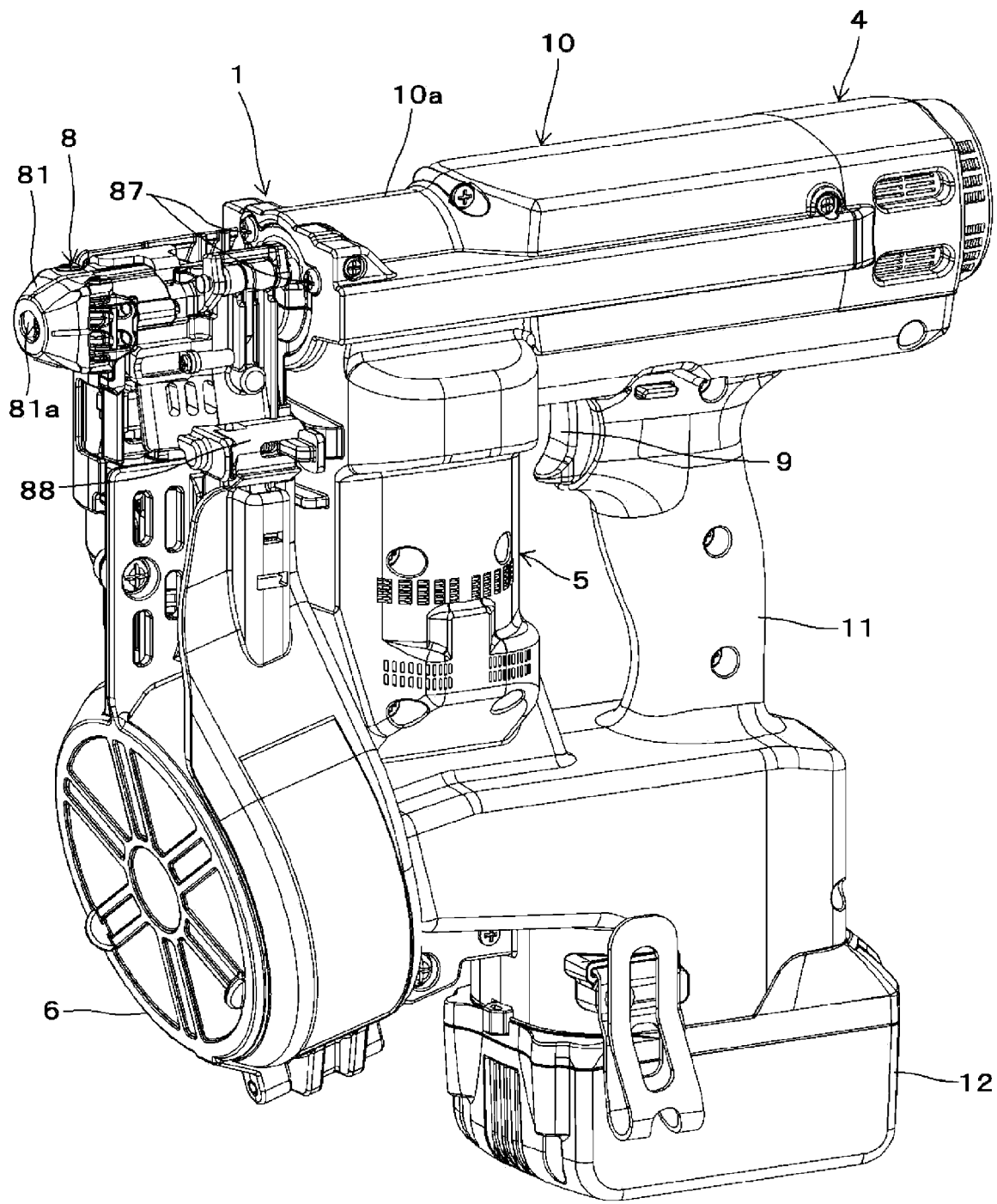
FIG. 4A is a perspective view showing the example of the fastening tool according to the present embodiment.
Figure 4B:
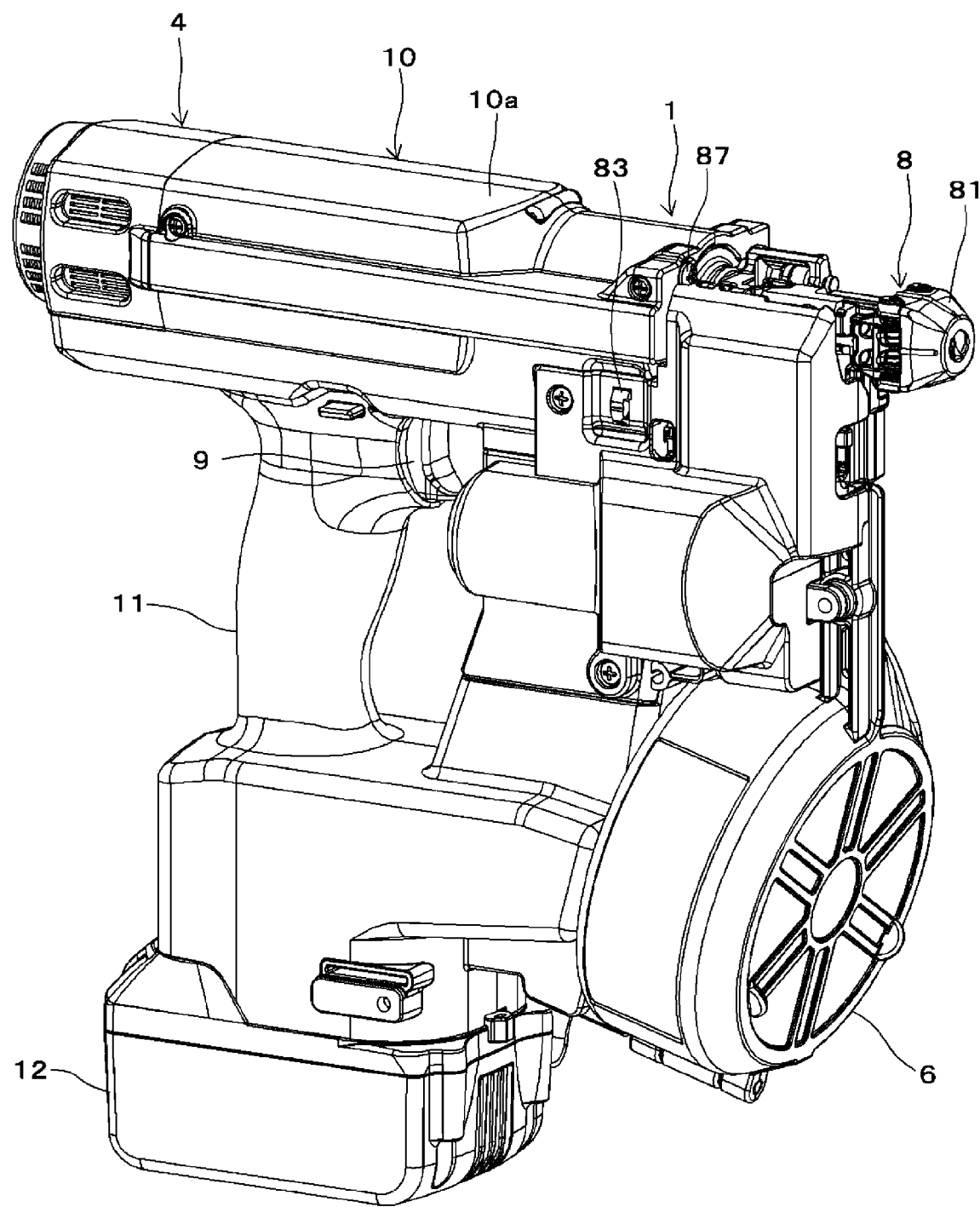
FIG. 4B is a perspective view showing the example of the fastening tool according to the present embodiment.

FIG. 1 is a side cross-sectional view showing an example of an internal structure of a fastening tool according to the present embodiment, and FIGS. 2A to 2C are partially broken perspective views showing the example of the internal structure of the fastening tool according to the present embodiment. FIG. 3A is a side view showing the example of the fastening tool according to the present embodiment, FIG. 3B is a front view showing the example of the fastening tool according to the present embodiment, and FIG. 3C is a top view showing the example of the fastening tool according to the present embodiment. Note that, a cut surface in FIG. 1 is an A-A line in FIG. 3B. In addition, FIGS. 4A and 4B are perspective views showing the example of the fastening tool according to the present embodiment.

A fastening tool 1 of the present embodiment includes a tool body 10 and a handle 11. In the fastening tool 1, the handle 11 extends in another direction intersecting with an extension direction of the tool body 10 extending in one direction. In the fastening tool 1, the direction in which the tool body 10 extends is referred to as a front and rear direction, and the direction in which the handle 11 extends is referred to as an upper and lower direction. In addition, the fastening tool 1 includes a battery attaching part 13 to which a battery 12 is detachably attached, at a lower part of the handle 11.

The fastening tool 1 includes a bit holding unit 3 configured to hold a driver bit 2 so as to be rotatable and to be movable in the front and rear direction along an axis direction, a first drive unit 4 configured to rotate the driver bit 2 held by the bit holding unit 3, and a second drive unit 5 configured to move the driver bit 2 held by the bit holding unit 3 in the front and rear direction along the axis direction.

Further, the fastening tool 1 includes a screw accommodating unit 6 in which a screw 200 is accommodated, a screw feeding unit 7 configured to feed the screw accommodated in the screw accommodating unit 6, and a nose unit 8 configured to be pressed against a fastening target to which the screw is to be fastened, and to eject the screw.

The bit holding unit 3 includes a holding member 30 configured to detachably hold the driver bit 2, a rotation guide member 31 configured to support the holding member 30 so as to be movable in the front and rear direction along an axis direction of the driver bit 2, and to rotate together with the holding member 30, a moving member 32 configured to move the holding member 30 in the front and rear direction along the rotation guide member 31, and an urging member 33 configured to urge rearward the moving member 32.

The holding member 30 is constituted by, for example, a circular cylinder-shaped member having an outer diameter slightly smaller than an inner diameter of the rotation guide member 31, and configured to be inserted inside the rotation guide member 31. The holding member 30 is provided at an end portion on a front side along the axis direction with an opening 30a having a shape that matches a cross-sectional shape of an insertion portion 20 of the driver bit 2. The holding member 30 has a mechanism configured to detachably hold the insertion portion 20 of the driver bit 2 by a known mechanism and provided at the opening 30a. In the holding member 30, the opening 30a is exposed inside the rotation guide member 31, and the insertion portion 20 of the driver bit 2 is detachably inserted in the opening 30a.

The rotation guide member 31 has a cylindrical shape extending along an extension direction of the tool body 10, in which the holding member 30 is inserted, and an end portion on a front side is rotatably supported via a bearing 34a by a metal front frame 10b provided on a front side of a resin case 10a constituting an exterior of the tool body 10. In addition, an end portion on a rear side of the rotation guide member 31 is connected to the first drive unit 4.

In the rotation guide member 31, groove portions 31a extending in the front and rear direction along the axis direction of the driver bit 2 are formed at two locations on side parts facing in a radial direction. The rotation guide member 31 is connected to the holding member 30 via connecting members 30b configured to penetrate the holding member 30 in the radial direction and to protrude from both sides of the holding member 30 as the connecting members 30b enter the groove portions 31a.

Thereby, when the rotation guide member 31 rotates, the connecting members 30b are pushed by the groove portions 31a of the rotation guide member 31, so that the holding member 30 rotates together with the rotation guide member 31. Further, the connecting members 30b are guided by the groove portions 31a of the rotation guide member 31, so that the holding member 30 moves in the front and rear direction along the axis direction of the driver bit 2.

The moving member 32 is an example of a transmission member, and includes a first moving member 32a configured to rotate together with the holding member 30 and to move the holding member 30 in the front and rear direction along the rotation guide member 31, a second moving member 32c configured to be supported via a bearing 32b by the first moving member 32a and to push the first moving member 32a with the bearing 32b, and a cushioning member 32d attached to a rear side of the second moving member 32c.

The first moving member 32a is constituted by, for example, a circular cylinder-shaped member having an inner diameter slightly greater than an outer diameter of the rotation guide member 31, and configured to be inserted to an outer side of the rotation guide member 31. The first moving member 32a is connected to the holding member 30 via the connecting members 30b protruding from the groove portions 31a of the rotation guide member 31.

The bearing 32b is inserted between an outer periphery of the first moving member 32a and an inner periphery of the second moving member 32c, and is configured to rotatably support the first moving member 32a with respect to the second moving member 32c.

The second moving member 32c is connected to the first moving member 32a via the bearing 32b in a state where movement in the front and rear direction along the axis direction is restricted.

Thereby, as the second moving member 32c moves in the front and rear direction along the axis direction, the first moving member 32a is pushed by the second moving member 32c via the bearing 32b, and moves in the front and rear direction along the axis direction together with the second moving member 32c. Further, the first moving member 32a is configured to be rotatable with respect to the second moving member 32c.

The urging member 33 is constituted by a coil spring in the present example, is inserted between the front frame 10b provided on the front side of the case 10a of the tool body 10 and the second moving member 32c of the moving member 32, outside the rotation guide member 31, and is in contact with a spring seat arranged to contact an end face of an outer ring of the bearing 32b. The urging member 33 is compressed as the moving member 32 moves forward, thereby applying, to the moving member 32, a force for pushing rearward the moving member 32.

The first drive unit 4 includes a bit rotating motor 40 configured to be driven by electricity supplied from the battery 12, and a speed reducer 41. The bit rotating motor 40 is an example of the first motor, in which a shaft 40a of the bit rotating motor 40 is connected to the speed reducer 41, and a shaft 41a of the speed reducer 41 is connected to the rotation guide member 31. In the first drive unit 4, the speed reducer 41 is configured to use a planetary gear, and the bit rotating motor 40 is arranged coaxially with the rotation guide member 31 and the driver bit 2 held by the holding member 30.

In the first drive unit 4, the bit rotating motor 40 and the speed reducer 41 are attached to a metal rear frame 10c provided on a rear side of the case 10a of the tool body 10, and the shaft 41a of the speed reducer 41 is supported by the rear frame 10c via a bearing 42.

The bit holding unit 3 and the first drive unit 4 are integrally assembled and unitized by connecting the front frame 10b and the rear frame 10c with a coupling member 10d extending in the front and rear direction, and are fixed to the case 10a of the tool body 10 by a screw 10e. The bit holding unit 3 and the first drive unit 4 are configured to be detachably attached to the tool body 10 in a state where each component is assembled. Therefore, the attaching ability is improved because each component is not independently fixed to the tool body 10.

Further, in the bit holding unit 3, an end portion on the front side of the rotation guide member 31 is supported via the bearing 34a by the front frame 10b provided on the front side of the case 10a of the tool body 10, and an end portion on the rear side of the rotation guide member 31 is supported via the shaft 41a of the speed reducer 41 and the bearing 42 by the rear frame 10c provided on the rear side of the case 10a. Therefore, in the bit holding unit 3, the rotation guide member 31 is rotatably supported by the tool body 10.

Thereby, the first drive unit 4 is configured to rotate the rotation guide member 31 by the bit rotating motor 40. When the rotation guide member 31 rotates, the connecting members 30b are pushed by the groove portions 31a of the rotation guide member 31, so that the holding member 30 configured to hold the driver bit 2 rotates together with the rotation guide member 31.

The second drive unit 5 includes a bit moving motor 50 configured to be driven by electricity supplied from the battery 12, and a speed reducer 51. The bit moving motor 50 is an example of the motor and the second motor, in which a shaft 50a of the bit moving motor 50 is connected to the speed reducer 51, and a shaft 51a of the speed reducer 51 is connected to a pulley 52, which is an example of the transmission member. In the second drive unit 5, the pulley 52 is supported by the tool body 10 via a bearing 53. In the second drive unit 5, the shaft 50a of the bit moving motor 50 is arranged along the extension direction of the handle 11.

In the second drive unit 5, a wire 54, which is an example of the transmission member, is wound on the pulley 52, and the wire 54 is connected to the second moving member 32c of the moving member 32.

Thereby, the second drive unit 5 is configured to move forward the second moving member 32c by rotating the pulley 52 by the bit moving motor 50 to wind up the wire 54. In the bit holding unit 3, when the second moving member 32c moves forward, the first moving member 32a is pushed via the bearing 32b, and the first moving member 32a moves forward along the axis direction, together with the second moving member 32c. The first moving member 32a moves forward, so that the holding member 30 connected to the first moving member 32a via the connecting members 30b moves forward.

The second drive unit 5 is arranged offset to one side with respect to a substantial center in a right and left direction of the fastening tool 1 so that a tangential direction of a portion of the pulley 52 where the wire 54 is wound follows the extension direction of the rotation guide member 31. Thereby, the wire 54 between the pulley 52 and the second moving member 32c is stretched linearly along a moving direction of the moving member 32, and increases in load at a time of winding up the wire 54 by the pulley 52 and load at a time of pulling out the wire 54 from the pulley 52 are suppressed.

The first drive unit 4 is provided at the rear, which is one side of the tool body 10, with the handle 11 interposed therebetween. In addition, the second drive unit 5 is provided at the front, which is the other side of the tool body 10, with the handle 11 interposed therebetween.

In the screw accommodating unit 6, a plurality of screws 200 are connected by a connecting band and a spirally wound connected screw is accommodated.

Figure 5:
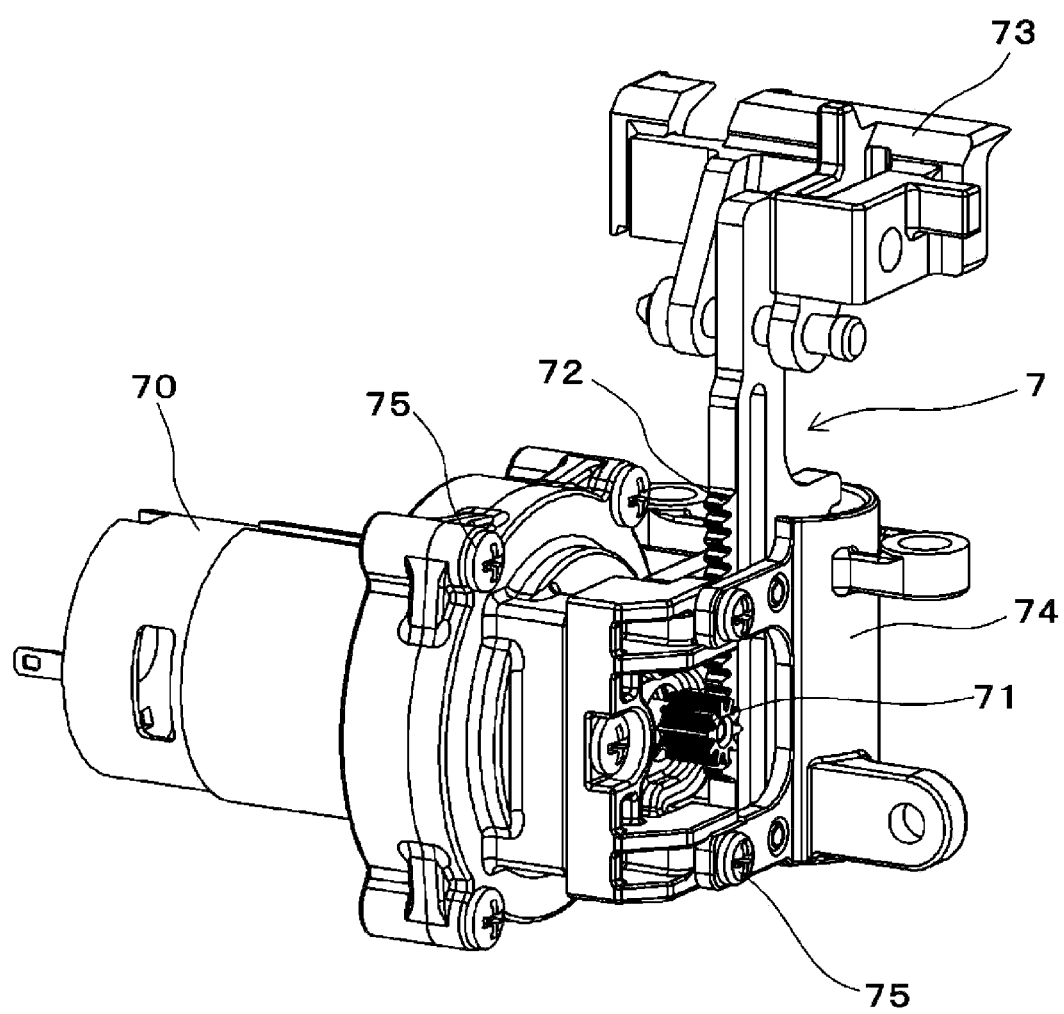
FIG. 5 is a perspective view showing details of a screw feeding unit according to present embodiment.

FIG. 5 is a perspective view showing details of a screw feeding unit according to present embodiment. The screw feeding unit 7 includes a screw feeding motor 70, a pinion gear 71 attached to a shaft of the screw feeding motor 70, a rack gear 72 in mesh with the pinion gear 71, and an engaging part 73 connected to the rack gear 72 and engaged with the connected screw fed from the screw accommodating unit 6. The screw feeding unit 7 constitutes a screw feeding transmission part configured to transmit a drive force of the screw feeding motor 70 to the engaging part 73, by the pinion gear 71 and the rack gear 72. The engaging part 73 is urged upward by a compression spring (not shown) via a component on which the rack gear 72 is formed, and is configured so that the engaging part 73 and the screws 200 do not descend due to weights thereof in a state where power is not supplied to the screw feeding motor 70.

In the screw feeding unit 7, the screw feeding motor 70 is fixed to a sub-frame 74, and the rack gear 72 is supported by the sub-frame 74 so as to be movable in the upper and lower direction along a feeding direction of the connected screw. The screw feeding unit 7 is unitized by integrally assembling each component by unevenness-shaped fitting such as a claw, fastening of a screw 75, or the like.

Figure 6A:
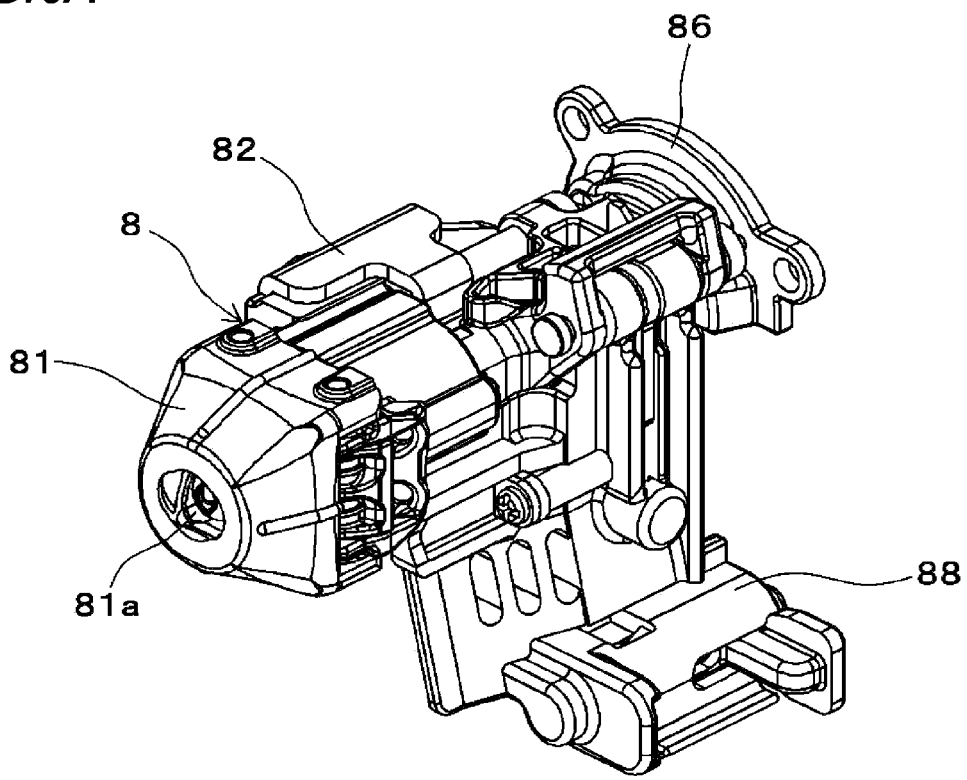
FIG. 6A is a perspective view showing an example of a nose unit according to the present embodiment.
Figure 6B:
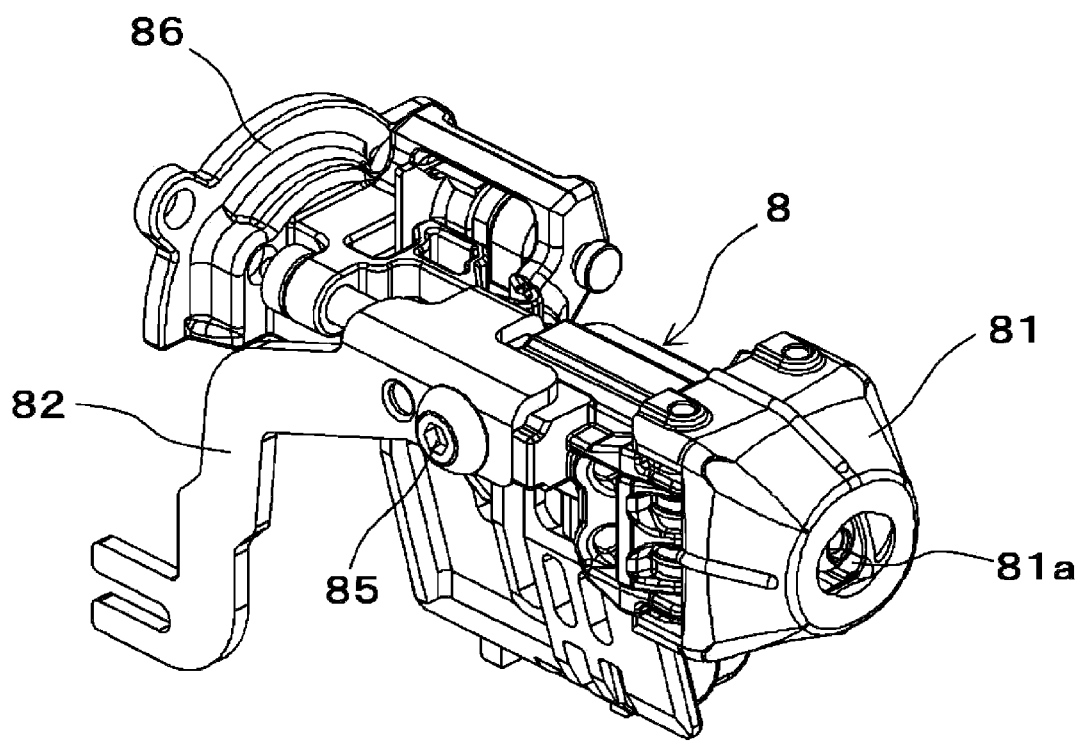
FIG. 6B is a perspective view showing the example of the nose unit according to the present embodiment.

FIGS. 6A and 6B are perspective views showing an example of the nose unit according to the present embodiment. The nose unit 8 is an example of the first nose unit, and includes an ejection passage constituting portion 80a, which constitutes an ejection passage 80 to which the screw 200 is supplied by the screw feeding unit 7 and through which the driver bit 2 passes, a contact member 81 having an ejection port 81a formed to communicate with the ejection passage 80 and configured to come into contact with a fastening target, a contact arm 82 configured to move in the front and rear direction in conjunction with the contact member 81, and an adjusting part 83 configured to restrict an amount of movement of the contact arm 82. In addition, the nose unit 8 includes a cover member 88 configured to cover a path, through which the screw 200 is to pass, from the screw accommodating unit 6 to the ejection passage 80 in an openable and closable manner.

As shown in FIG. 2C, the fastening tool 1 includes a contact switch part 84 configured to be pushed and actuated by the contact arm 82. Further, as shown in FIG. 2C, in the fastening tool 1, the tool body 10 has a nose body part 10f, and the nose body part 10f has an ejection passage constituting portion 80b, which constitutes the ejection passage 80 by a combination with the ejection passage constituting portion 80a of the nose unit 8. The nose body part 10f is an example of the second nose unit, and is integrally configured with, for example, the front frame 10b. Note that, the nose body part 10f may have a configuration where a component independent of the front frame 10b is fixed to the front frame 10b.

In the nose unit 8, the contact member 81 is supported to be movable in the front and rear direction, and the contact arm 82 is configured to move in the front and rear direction in conjunction with the contact member 81. In the nose unit 8, the contact member 81 is urged forward by an urging member (not shown), and the contact member 81 pressed against the fastening target and moved rearward is urged and moved forward by the urging member.

In the nose unit 8, an amount of movement of the contact arm 82 until the contact arm 82 is moved rearward due to the pressing of the contact arm 81 against the fastening target and the contact switch part 84 is actuated is adjusted by the adjusting part 83. The contact switch part 84 is switched between actuation and non-actuation by being pushed by the contact arm 82. In the present example, a state where the contact switch part 84 is not pressed by the contact arm 82 and is not actuated is referred to as 'off of the contact switch part 84', and a state where the contact switch part 84 is pushed by the contact arm 82 and is thus actuated is referred to as 'on of the contact switch part 84'.

In the nose unit 8, the respective components constituting the ejection passage 80, the contact member 81, and the contact arm 82 are integrally assembled and unitized to the sub-frame 86 by unevenness-shaped fitting such as a claw, fastening of a screw 85, or the like, and are fixed to the front frame 10b constituting the tool body 10 by a screw 87. When the nose unit 8 is fixed to the front frame 10b, the ejection passage 80 is constituted by the ejection passage constituting portion 80b of the nose body part 10f fixed to the tool body 10-side and the ejection passage constituting portion 80a that is a component on the nose unit 8-side.

The sub-frame 86 having a function of fixing the nose unit 8 to the tool body 10 is formed with the ejection passage constituting portion 80a, which constitutes a part of the ejection passage 80, and also has a function of positioning the ejection passage 80 with respect to the tool body 10. Thereby, when the nose unit 8 is fixed to the front frame 10b, the ejection passage constituting portion 80a is correctly positioned, and even when the nose unit 8 is configured to be detachably attached to the tool body 10, the ejection passage 80 is suppressed from being positionally misaligned, particularly, in the radial direction with respect to a movement path of the driver bit 2. Further, the contact switch part 84 is attached to the tool body 10-side, and when the nose unit 8 is fixed to the front frame 10b, a position of the contact arm 82 on a side facing the contact switch part 84 matches the contact switch part 84.

The screw feeding unit 7 is configured integrally with the front frame 10b, or is fixed to the front frame 10, so that the sub-frame 74 is fixed to the nose body part 10f constituting the tool body 10 by the screw 76.

The fastening tool 1 includes a trigger 9 configured to receive an operation and a trigger switch part 90 configured to be actuated by an operation of the trigger 9. The trigger 9 is provided on a front side of the handle 11 and is configured to be operable by a finger of a hand gripping the handle 11. The trigger switch part 90 is configured to be pushed and actuated by the trigger 9.

The trigger switch part 90 is switched between actuation and non-actuation by being pushed by the trigger 9. In the present example, a state where the trigger 9 is not operated, the trigger switch part 90 is not pushed by the trigger 9 and the trigger switch part 90 is not actuated is referred to as 'off of the trigger switch part 90', and a state where the trigger 9 is operated and the trigger switch part 90 is pushed and actuated by the trigger 9 is referred to as 'on of the trigger switch part 90'.

The fastening tool 1 includes a control unit 100 configured to control the first drive unit 4, the second drive unit 5 and the screw feeding unit 7, based on outputs of the trigger switch part 90 configured to be actuated by the operation of the trigger 9 and the contact switch part 84 configured to be pushed and actuated by the contact member 81. In the present example, the control unit 100 is installed in the battery attaching part 13 provided at the lower part of the handle 11.

Operation Example of Fastening Tool of Present Embodiment

Figure 7:
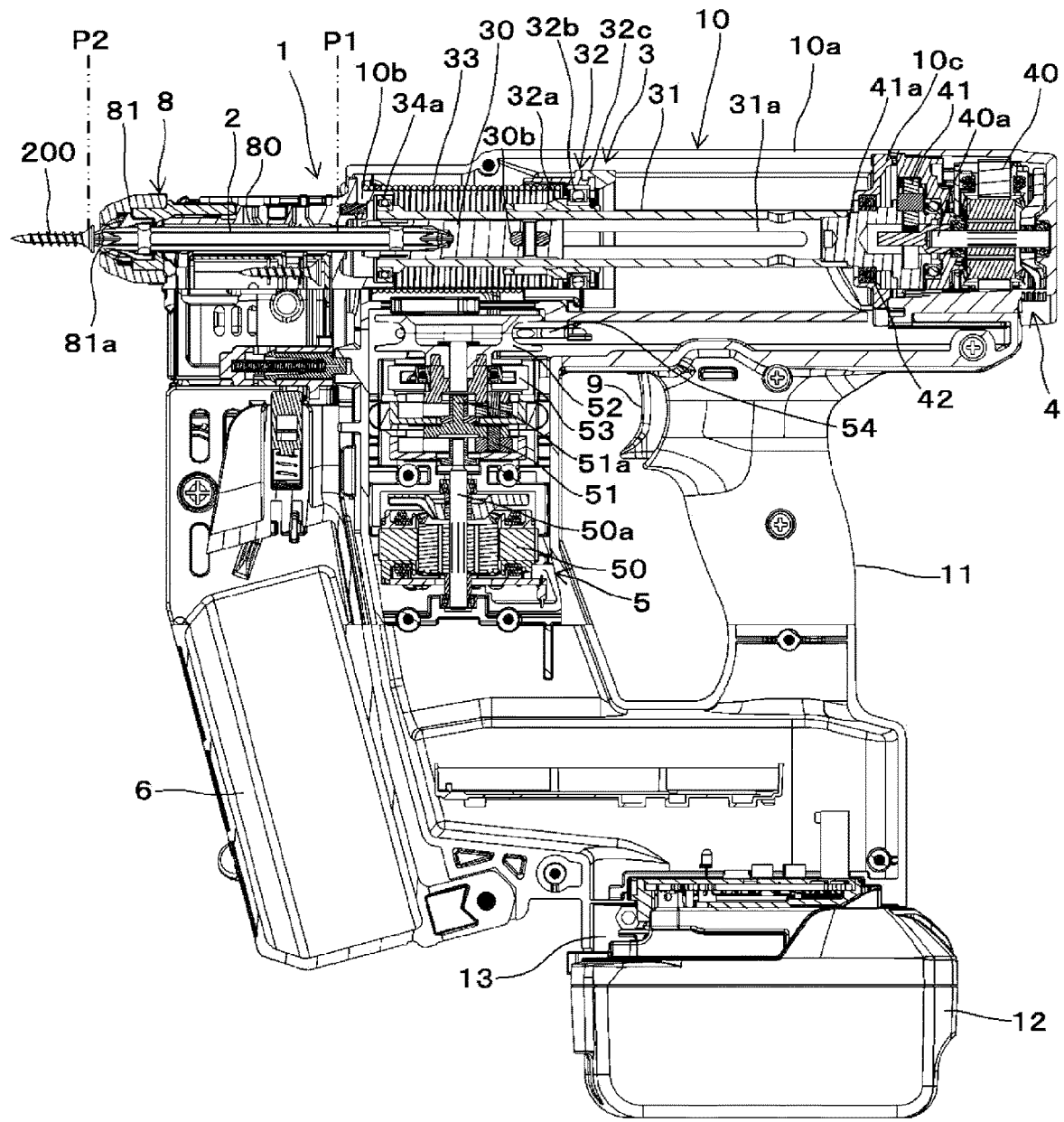
FIG. 7 is a side cross-sectional view showing an example of an operation of the fastening tool according to the present embodiment.
Figure 8A:
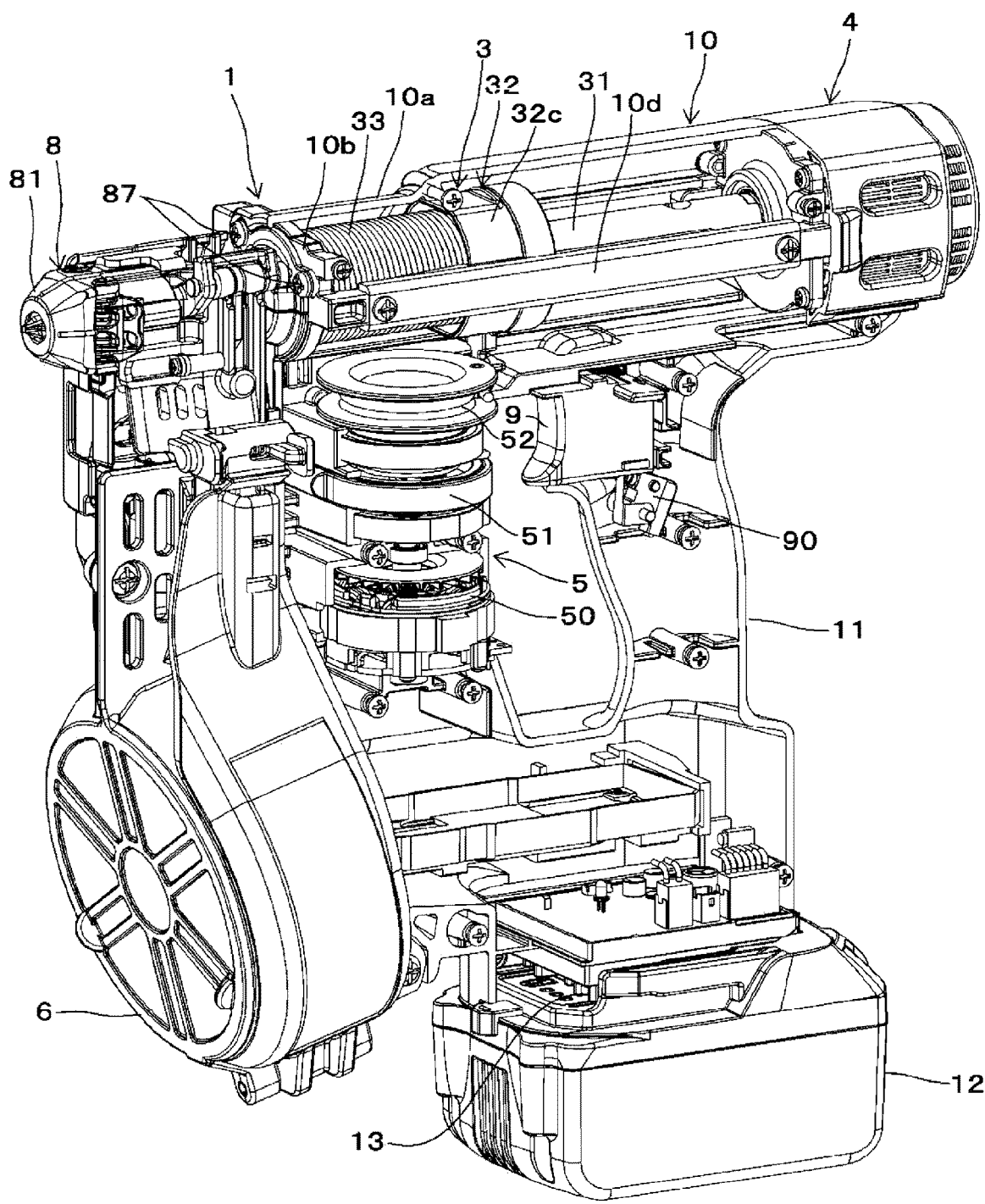
FIG. 8A is a partially broken perspective view showing the example of the operation of the fastening tool according to the present embodiment.
Figure 8B:
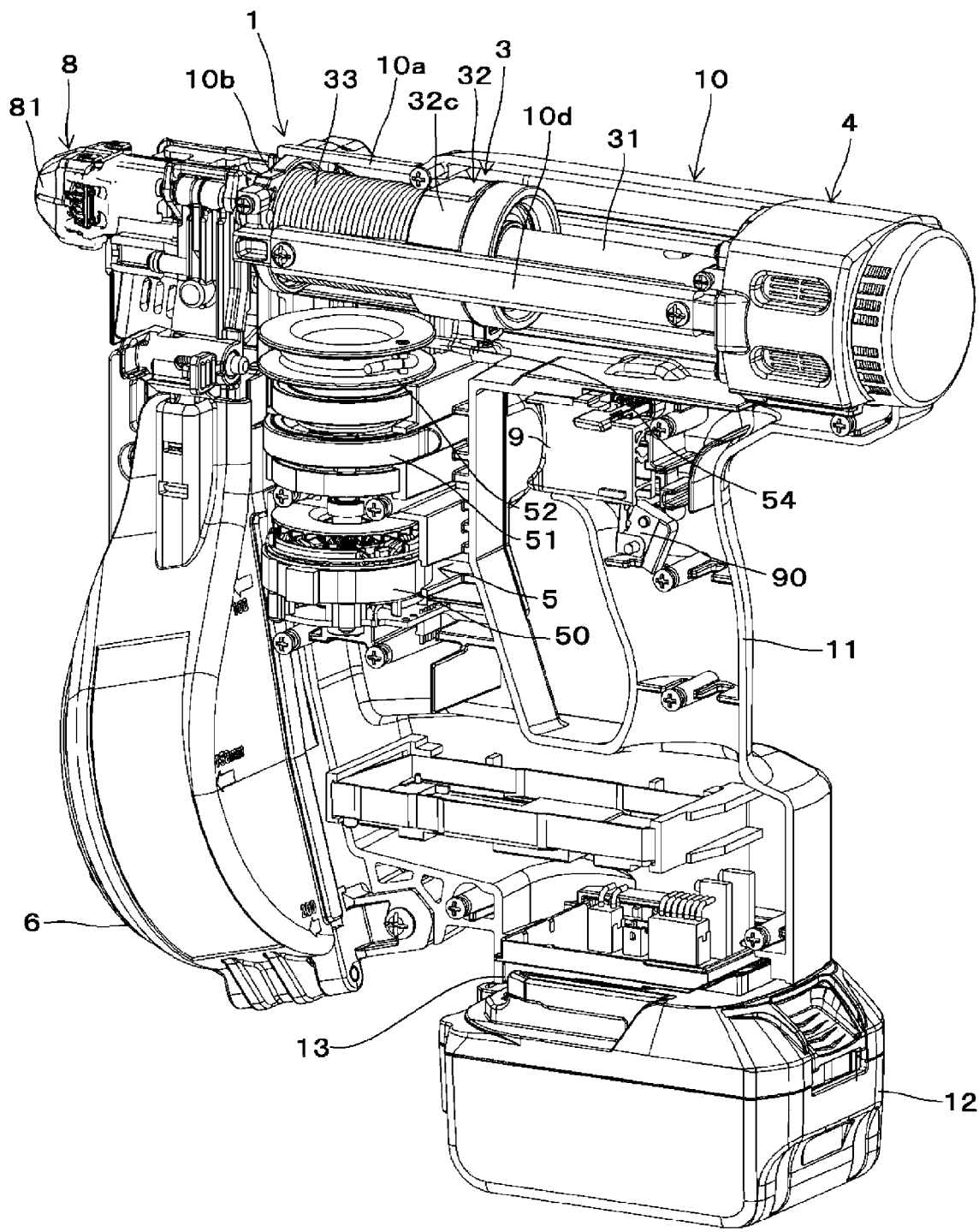
FIG. 8B is a partially broken perspective view showing the example of the operation of the fastening tool according to the present embodiment.

FIG. 7 is a side cross-sectional view showing an example of an operation of the fastening tool according to the present embodiment, and FIGS. 8A and 8B are partially broken perspective views showing the example of the operation of the fastening tool according to the present embodiment. In the below, a fastening operation of the fastening tool according to the present embodiment is described with reference to the respective drawings.

In a standby state, as shown in FIG. 1, a tip end of the driver bit 2 is located at a standby position P1 behind the ejection passage 80, and the fastening tool 1 can supply the screw 200 to the ejection passage 80.

When the contact member 81 is pressed against the fastening target, the contact switch part 84 is pushed by the contact arm 82, the contact switch part 84 becomes on, the trigger 9 is operated and the trigger switch part 90 becomes on, the control unit 100 drives the bit moving motor 50 of the second drive unit 5 and also drives the bit rotating motor 40 of the first drive unit 4 at a predetermined timing.

When the bit moving motor 50 is driven and rotates in a positive direction, which is one direction, the pulley 52 rotates in the positive direction, so that the wire 54 is wound on the pulley 52. The wire 54 is wound on the pulley 52, so that the second moving member 32c connected to the wire 54 is guided to the rotation guide member 31 and moves forward along the axis direction. When the second moving member 32c moves forward, the first moving member 32a is pushed by the second moving member 32c via the bearing 32b, and moves forward along the axis direction while compressing the urging member 33, together with the second moving member 32c.

When the first moving member 32a moves forward, the connecting members 30b are guided to the groove portions 31a of the rotation guide member 31, so that the holding member 30 connected to the first moving member 32a by the connecting members 30b moves forward along the axis direction of the driver bit 2.

Thereby, the driver bit 2 held by the holding member 30 moves forward, engages with the screw 200 supplied to the ejection port 81a of the nose unit 8, moves the screw 200 forward and presses the same against the fastening target.

When the bit rotating motor 40 is driven and rotates in the positive direction, which is one direction, the rotation guide member 31 rotates in the positive direction. When the rotation guide member 31 rotates in the positive direction, the connecting members 30b connected to the holding member 30 is pushed by the groove portions 31a of the rotation guide member 31, so that the holding member 30 rotates together with the rotation guide member 31.

Thereby, the driver bit 2 held by the holding member 30 rotates the screw 200 in the positive direction (clockwise direction) and screws the same into the fastening target. The control unit 100 moves forward the driver bit 2 by the second drive unit 5 to make the driver bit 2 to follow the screw to be screwed into the fastening target, based on a load applied to the bit rotating motor 40, the number of rotations of the bit rotating motor 40, a load applied to the bit moving motor 50, the number of rotations of the bit moving motor 50, and the like, in conjunction with the operation of rotating the driver bit 2 by the first drive unit 4 to screw the screw into the fastening target.

As shown in FIG. 7, the control unit 100 stops the driving of the bit rotating motor 40 and moves reversely the bit moving motor 50 when the tip end of the driver bit 2 protrudes from the ejection port 81a of the contact member 81 and reaches a predetermined actuation end position P2. The control unit 100 may determine that the tip end of the driver bit 2 has reached the actuation end position P2, based on the number of rotations of the bit moving motor 50, or may vary the actuation end position P2, based on the load applied to the bit rotating motor 40, the number of rotations of the bit rotating motor 40, the load applied to the bit moving motor 50, the number of rotations of the bit moving motor 50, and the like.

When the bit moving motor 50 rotates in an opposite direction, which is the other direction, the pulley 52 rotates in the opposite direction, so that the wire 54 is pulled out from the pulley 52. The wire 54 is pulled out from the pulley 52, so that the urging member 33 compressed by the second moving member 32c moving forward is stretched to push the second moving member 32c rearward.

The second moving member 32c is pushed rearward by the urging member 33, so that it is guided to the rotation guide member 31 and moves rearward along the axis direction. When the second moving member 32c moves rearward, the first moving member 32a is pushed by the second moving member 32c via the bearing 32b, and moves rearward along the axis direction, together with the second moving member 32c.

When the first moving member 32a moves rearward, the connecting members 30b are guided to the groove portions 31a of the rotation guide member 31, so that the holding member 30 connected to the first moving member 32a by the connecting members 30b moves rearward along the axis direction of the driver bit 2.

Thereby, the driver bit 2 held by the holding member 30 moves rearward, and the tip end of the driver bit 2 returns to the standby position P1. Note that, the moving member 32 is provided with the cushioning member 32d made of rubber or the like on a rear side of the second moving member 32c, so that while the second moving member 32c moves rearward, the second moving member 32c is suppressed from directly colliding with the rear frame 10c, and therefore, sound generation and damage can be suppressed. When the second moving member 32c is pushed rearward by the urging member 33 and the tip end of the driver bit 2 returns to the standby position P1, the control unit 100 stops the rotation of the bit moving motor 50. When the trigger switch part 90 becomes off, the control unit 100 rotates the screw feeding motor 70 in one direction to lower the engaging part 73. When the engaging part 73 descends to a position where it engages with a next screw 200, the control unit 100 raises the engaging part 73 by rotating reversely the screw feeding motor 70, and supplies the next screw 200 to the ejection passage 80.

The fastening tool 1 includes the battery 12 detachably attached to the battery attaching part 13 provided to the handle 11, the first drive unit 4 configured to rotate the driver bit 2 by the bit rotating motor 40, which is configured to be driven by electricity supplied from the battery 12, and the second drive unit 5 configured to move the driver bit 2 in the front and rear direction along the axis direction by the bit moving motor 50, which is configured to be driven by electricity supplied from the battery 12. This eliminates a need to connect a hose, as in a pneumatically driven fastening tool, improving workability.

In addition, the fastening tool 1 includes the second drive unit 5 configured to move the driver bit 2 in the front and rear direction along the axis direction, so that it is possible to perform the fastening of the screw without moving the fastening tool 1 toward the fastening target, in a state where the contact member 81 is butted against the fastening target. This eliminates a need to move the tool body toward a fastening target, as in a usual drill driver or impact driver, improving workability.

Further, since the second drive unit 5 is configured to press the screw engaged with the driver bit 2 against the fastening target by the drive force of the bit moving motor 50, it is possible to easily adjust excess or deficiency in force for pressing the screw against the fastening target, so that it is possible to press the screw against the fastening target with an appropriate force.

Further, the first drive unit 4 is provided at the rear of the tool body 10, which is one side, with the handle 11 interposed therebetween, and the second drive unit 5 is provided at the front of the tool body 10, which is the other side, with the handle 11 interposed therebetween. Thereby, the first drive unit 4 and the second drive unit 5, which each have a motor and therefore are relatively heavy, are dispersedly arranged at the front and at the rear with the handle 11 interposed therebetween. Therefore, in a case where the fastening operation is performed while gripping the handle 11 with a hand and maintaining the tool body 10 in a substantially horizontal direction that is an extension direction, a weight balance between front and rear of the handle 11 is substantially even, and workability is improved.

Further, the second drive unit 5 is arranged offset to the left, which is one side with respect to the substantial center in the right and left direction of the fastening tool 1, and the screw feeding motor 70 of the screw feeding unit 7 is arranged offset to the right, which is the other side with respect to the center in the right and left direction of the fastening tool 1. Thereby, a weight balance between the left and right is also substantially even, and workability is improved.

As described above, in the fastening tool 1, the first drive unit 4 configured to rotate the driver bit 2 and the second drive unit 5 configured to move the driver bit 2 in the front and rear direction along the axis direction are driven by independent motors. Thereby, as compared to a configuration where two operations are performed by a single drive source, a drive force transmission mechanism, a mechanism for causing the drive force to be transmitted at a predetermined timing, and the like are unnecessary, so that the configuration can be simplified. In addition, since the configuration can be simplified, a weight can be reduced. Further, the interlocking of two operations can be performed by control.

Further, the screw feeding unit 7 can also be driven with the electricity supplied from the battery 12 by using the screw feeding motor 70 as a drive source, and does not require supply of an air pressure. Further, since the screw feeding unit 7 is driven by a motor independent of the rotation and movement of the driver bit 2, the configuration can be simplified, as compared to a configuration in which two or three operations are performed by a single drive source. Further, the interlocking of a plurality of operations can be performed by control.

The screw feeding unit 7 is configured to be detachably attached to the nose body part 10f constituting the tool body 10, in a state where each component is unitized and assembled. Thereby, each component such as the screw feeding motor 70 is not independently fixed to the tool body 10, so that the assembling property is improved and maintenance, replacement at the time of inspection, and the like can also be easily performed. In addition, the accuracy among the respective components can be improved, as compared to a configuration where each component is independently fixed to the tool body 10. Further, since the nose body part 10f to which the screw feeding unit 7 is fixed is integrated with or fixed to the front frame 10b constituting the tool body 10, the accuracy of the attaching position of the screw feeding unit 7 to the tool body 10 can be improved. Further, since the nose body part 10f constitutes a part of the ejection passage 80 through which the driver bit 2 passes, the accuracy of the attaching position of the screw feeding unit 7 to the ejection passage 80 can be improved.

Figure 9A:
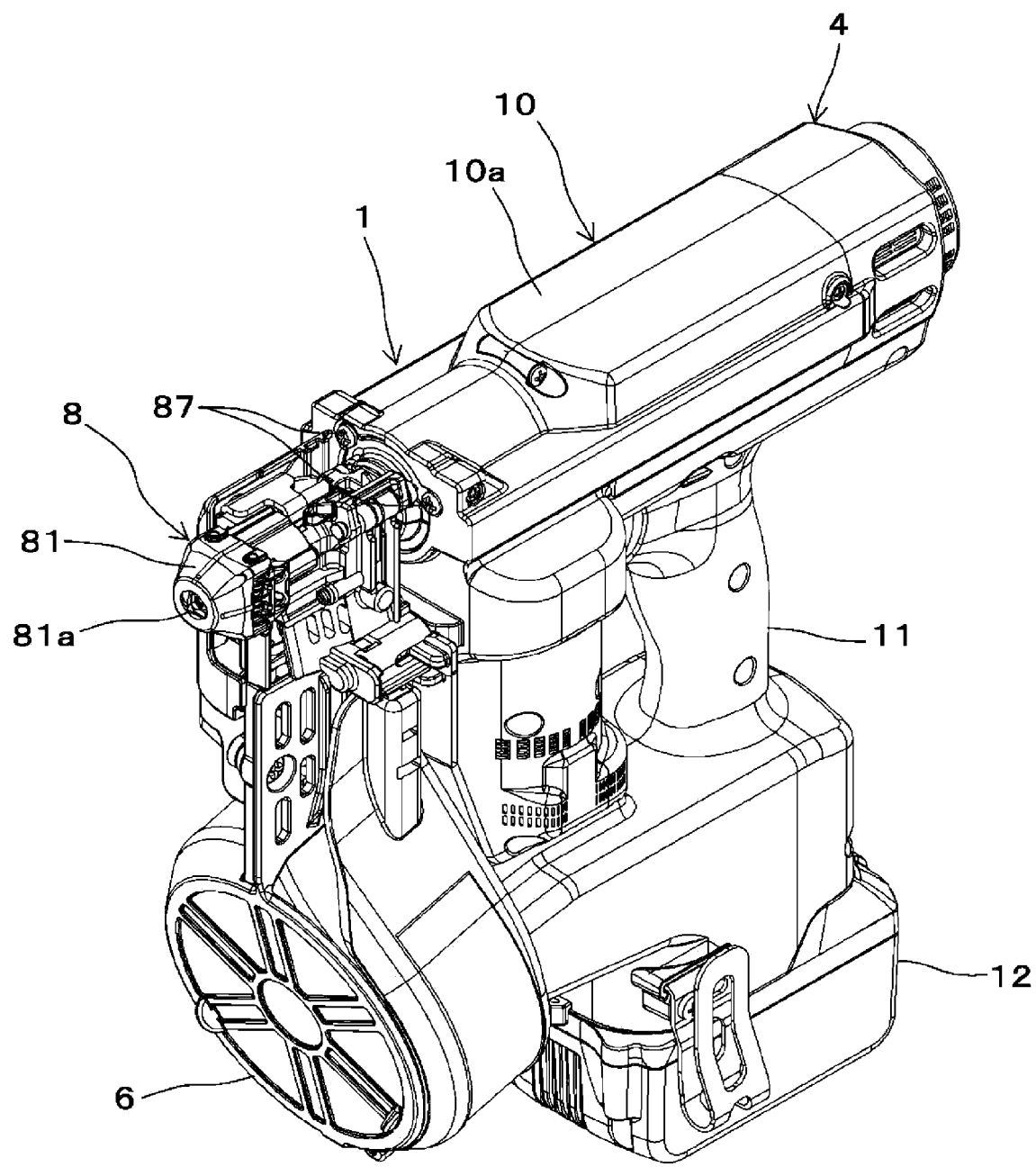
FIG. 9A is a perspective view showing an example of an operation of attaching and detaching a driver bit in the fastening tool according to the present embodiment.
Figure 9B:
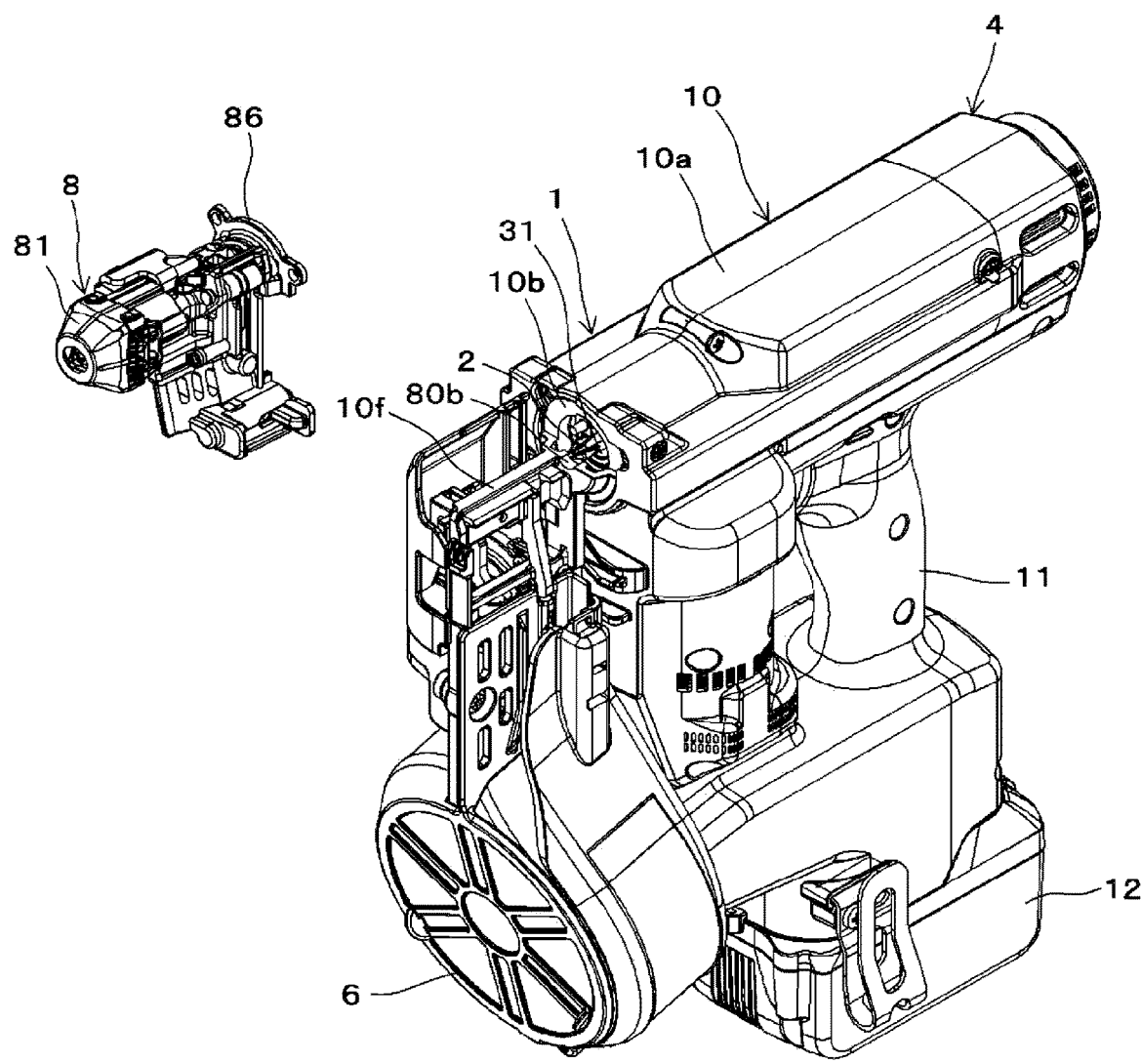
FIG. 9B is a perspective view showing the example of the operation of attaching and detaching the driver bit in the fastening tool according to the present embodiment.

FIGS. 9A and 9B are perspective views showing an example of an operation of attaching and detaching the driver bit in the fastening tool according to the present embodiment. Subsequently, the operation of attaching and detaching the driver bit 2 is described with reference to the respective drawings.

In the fastening tool 1, as shown in FIG. 1, the tip end of the driver bit 2 located at the standby position P1 is located at an inner side of the nose unit 8 and is not exposed to the ejection port 81a of the contact member 81. Therefore, when replacing the driver bit 2, the nose unit 8 is attached and detached.

To attach and detach the nose unit 8, the screw 87 is first removed. By removing the screw 87, the nose unit 8 can be removed from the fastening tool 1, as shown in FIG. 9B. The nose unit 8 is configured to be detachably attached to the tool body 10 in a state where each component is assembled, so that the contact member 81 covering the end portion on the front side of the tool body 10, the components constituting the ejection port 81a, and the like are integrally removed. When the nose unit 8 is removed the front frame 10b constituting the tool body 10, the ejection passage constituting portion 80a, which is a component on the nose unit 8-side, is removed from the ejection passage constituting portion 80b of the nose body part 10f fixed to the tool body 10-side, and the ejection passage 80 is exposed.

Thereby, the end portion on the front side of the rotation guide member 31 is exposed to the end portion on the front side of the tool body 10, and the driver bit 2 is exposed from the opening of the end portion on the front side of the rotation guide member 31. Therefore, the driver bit 2 can be removed from the holding member 30 by griping the driver bit with a tool such as pliers and pulling out the driver bit.

When attaching the driver bit 2, the driver bit 2 is inserted from the opening of the rotation guide member 31 and pushed into the opening 30a of the holding member 30, so that the driver bit 2 is held by the holding member 30. Then, the nose unit 8 is mounted to the end portion on the front side of the tool body 10 and the screw 87 is fastened, so that the nose unit 8 is fixed to the tool body 10.

Note that, in a configuration where the pulley 52 does not rotate even if an external force is applied to the pulley 52 while the bit moving motor 50 is stopped, due to a relation of a reduction ratio of the speed reducer 51 of the second drive unit 5, a bit exchange mode may be provided in which the rotation of the bit moving motor 50 is stopped in a state where the moving member 33 is moved to an exchange position where the tip end of the driver bit 2 is caused to protrude from the rotation guide member 31 by a predetermined amount.

The nose unit 8 is configured to be detachably attached to the tool body 10 in a state where each component constituting the ejection passage 80, the contact member 81, and the contact arm 82 is unitized and assembled. This is not a configuration in which each component such as the contact arm 82 is independently fixed to the tool body 10, and therefore, the assembling property is improved. In addition, the accuracy among the respective components can be improved, as compared to a configuration where each component is independently fixed to the tool body 10. Further, since the contact switch part 84 that requires wiring is attached to the tool body 10-side, it is not necessary to connect or disconnect the wiring.

Modified Embodiments of Fastening Tool of Present Embodiment

Figure 10A:
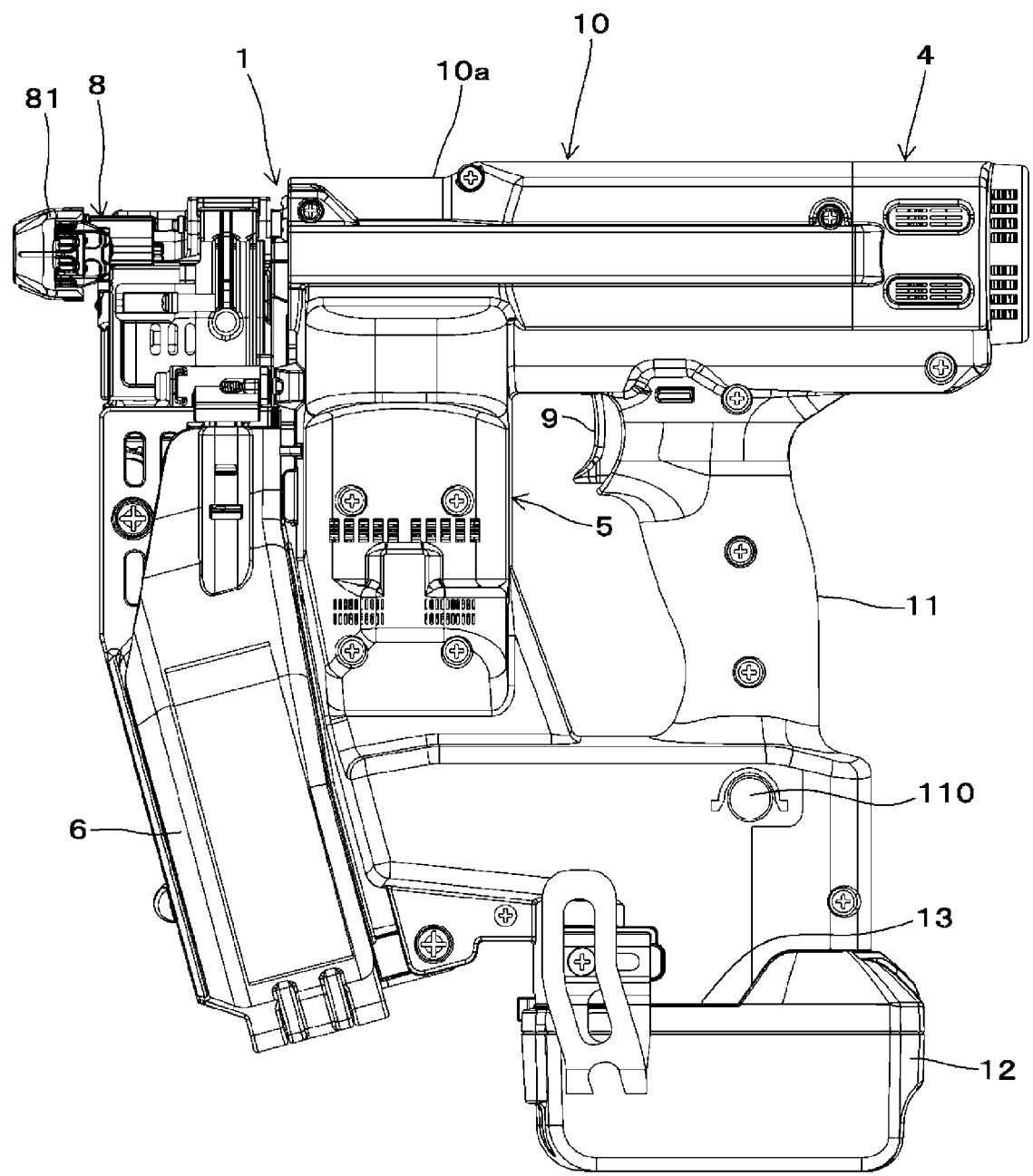
FIG. 10A is a side cross-sectional view showing a modified embodiment of the fastening tool according to the present embodiment.
Figure 10B:
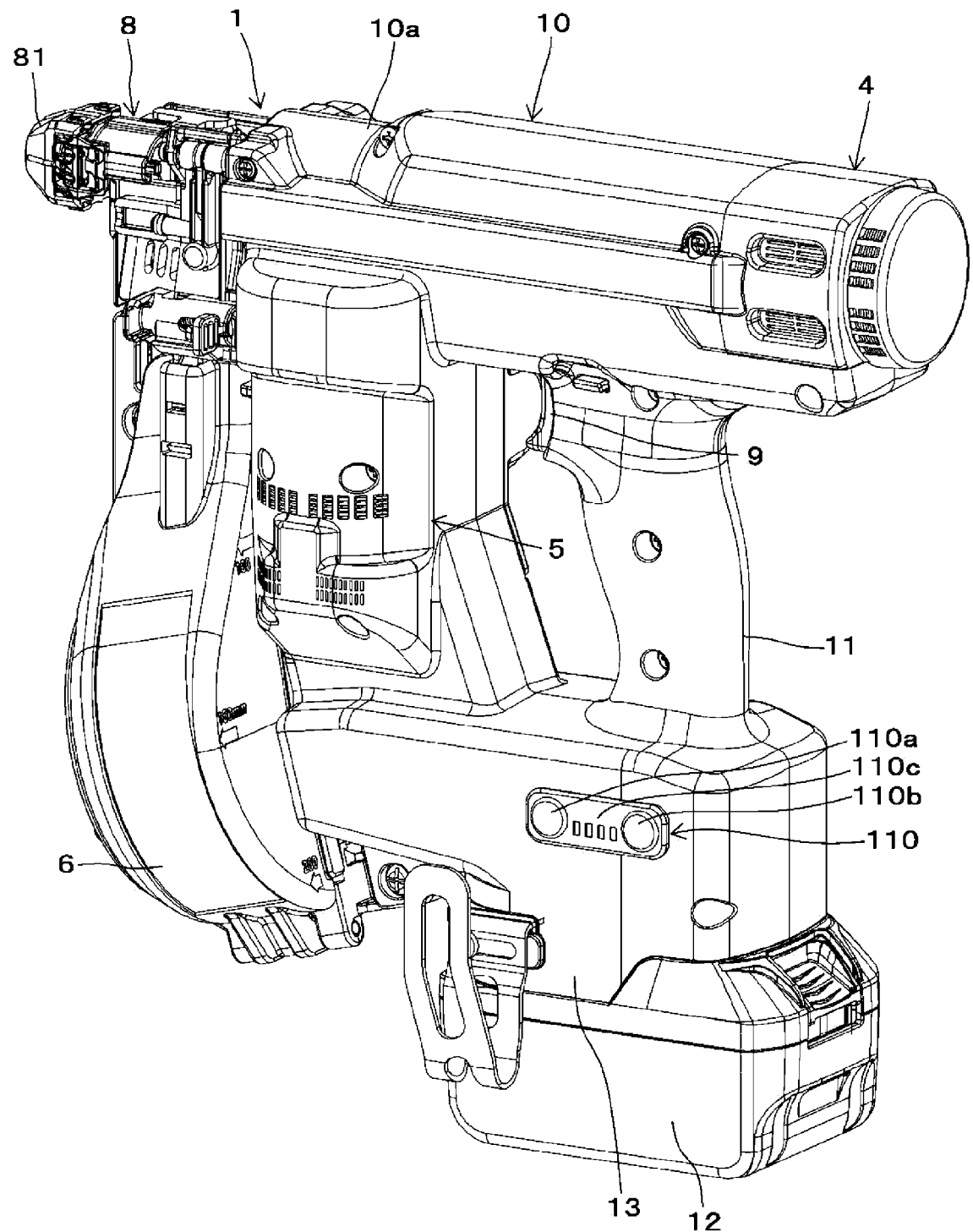
FIG. 10B is a side cross-sectional view showing another modified embodiment of the fastening tool according to the present embodiment.
Figure 11:
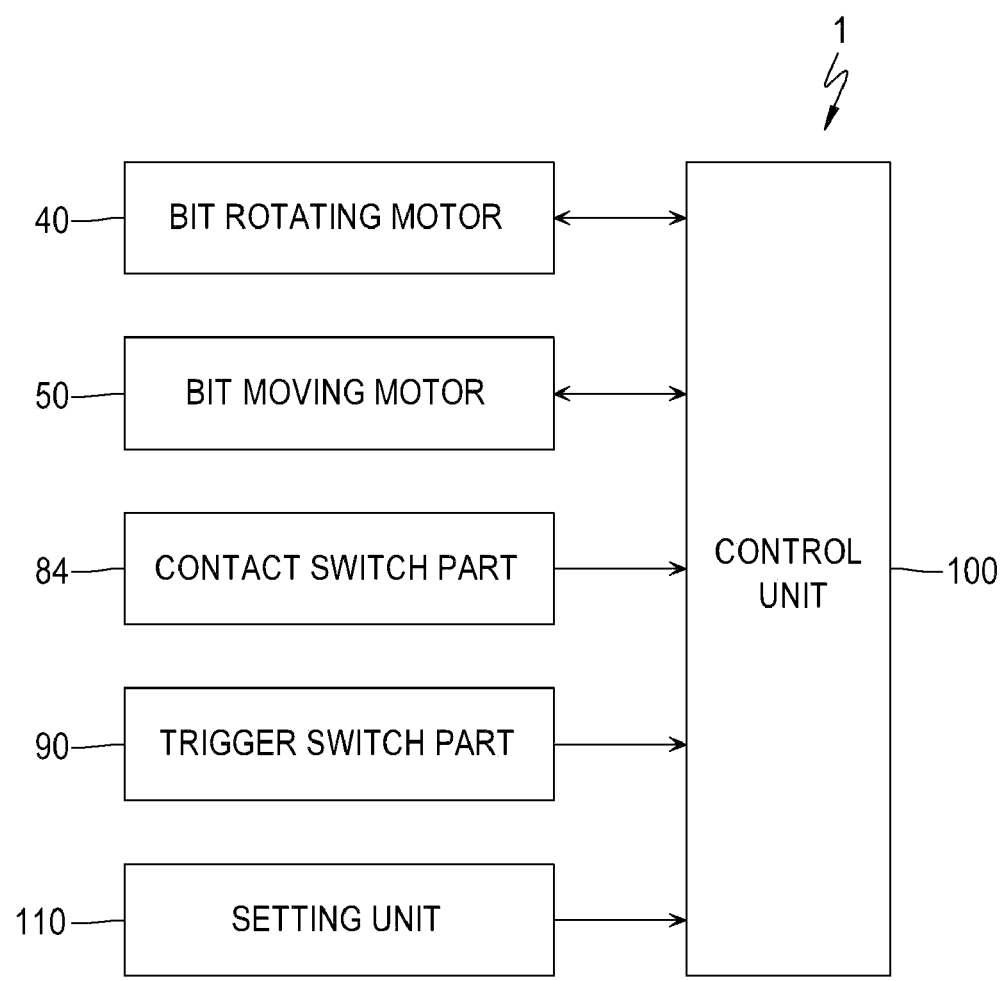
FIG. 11 is a block diagram showing a modified embodiment of the fastening tool according to the present embodiment.

FIG. 10A is a side cross-sectional view showing a modified embodiment of the fastening tool according to the present embodiment, FIG. 10B is a side cross-sectional view showing another modified embodiment of the fastening tool according to the present embodiment, and FIG. 11 is a block diagram showing the modified embodiment of the fastening tool according to the present embodiment.

As described above, the fastening tool 1 includes the second drive unit 5 configured to move the driver bit 2 in the front and rear direction along the axis direction, and the second drive unit 5 is configured to be driven by the bit moving motor 50, and the moving member 32 connected, by the wire 54, to the pulley 52 configured to be driven and to rotate by the bit moving motor 50 and the holding member 30 connected to the moving member 32 are configured to move forward along the axis direction of the driver bit 2, along the rotation guide member 31. Thereby, an amount of movement (amount of advance) of the driver bit 2 can be controlled by controlling an amount of rotation of the bit moving motor 50. That is, by rotating the bit moving motor 50 in conjunction with the rotation of the bit rotating motor 40 configured to rotate the driver bit 2 in a direction in which the screw 200 is fastened, the amount of advance of the driver bit 2 configured to advance following the screw 200 is controlled by an amount of rotation of the bit moving motor 50, as the screw 200 is fastened. As a result, a stop position of the driver bit 2 along the axis direction can be controlled.

Figure 12A:
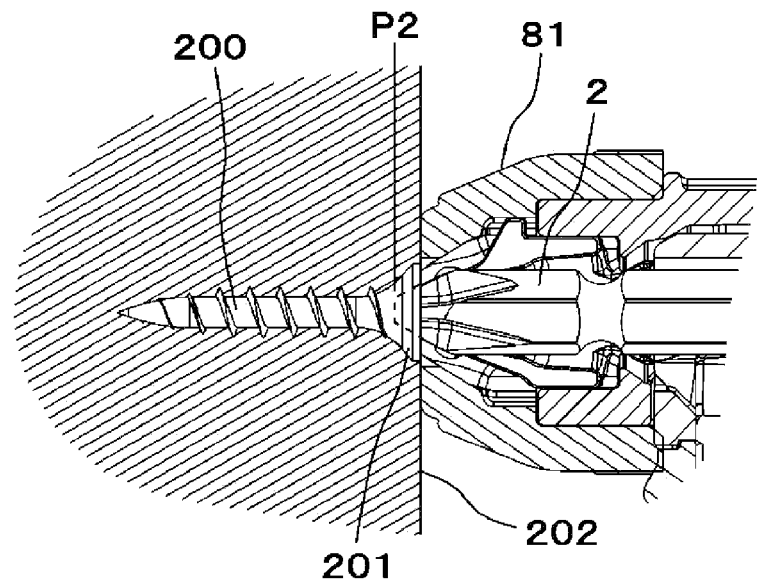
FIG. 12A is a cross-sectional view showing a fastened state of a screw.
Figure 12B:
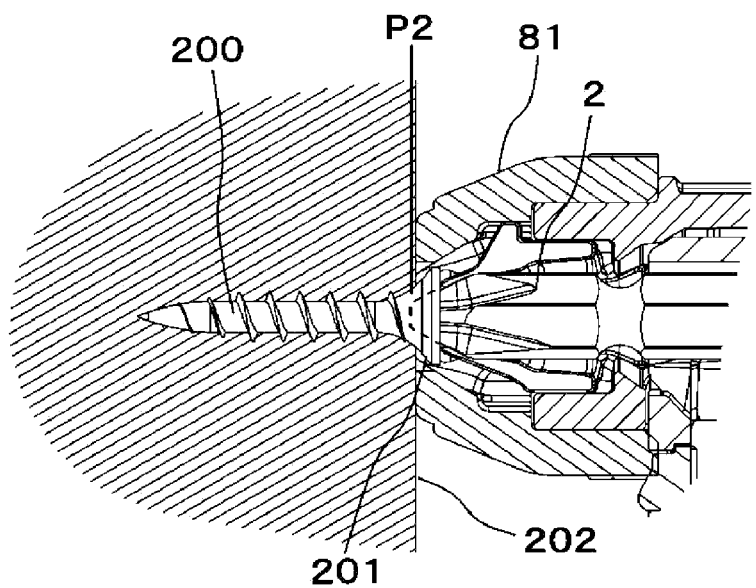
FIG. 12B is a cross-sectional view showing a fastened state of the screw.
Figure 12C:
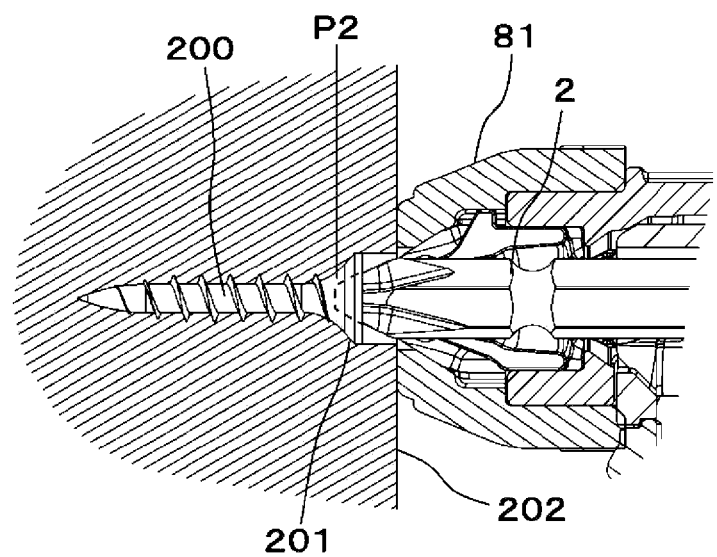
FIG. 12C is a cross-sectional view showing a fastened state of the screw.

FIGS. 12A to 12C are cross-sectional views showing fastened states of the screw, in which FIG. 12A shows a state where a head portion 201 of the screw 200 does not float or is not buried with respect to a surface of a fastening target 202, i.e., is so-called flush with the surface, FIG. 12B shows a state where the head portion 201 of the screw 200 floats from the fastening target 202, and FIG. 12C shows a state where the head portion 201 of the screw 200 is buried in the fastening target 202.

In the fastening tool 1, in a case where the screw 200 is a countersunk screw, the amount of advance of the driver bit 2 is preferably set so that a surface of the head portion 201 of the screw 200 becomes the same as, so-called flush with the surface of the fastening target 202 when the tip end of the driver bit 2 reaches the actuation end position P2, as shown in FIG. 12A. Note that, the screw 200 is not limited to the countersunk screw, and in a case of a pan, a bind, a truss, or the like, the amount of advance of the driver bit 2 is preferably set so that the seat surface of the head portion 201 of the screw 200 is in contact with the surface of the fastening target 202 and the head portion 201 of the screw 200 does not float from the fastening target 201.

In a case where the head portion 201 of the screw 200 floats from the fastening target 202 at the time when the tip end of the driver bit 2 reaches the actuation end position P2, as shown in FIG. 12B, the amount of advance of the driver bit 2 may be increased to advance the actuation end position P2. On the other hand, in a case where the head portion 201 of the screw 200 is buried in the fastening target 202, as shown in FIG. 12C, the amount of advance of the driver bit 2 may be reduced to retreat the actuation end position P2.

Therefore, a setting unit 110 configured to set the amount of advance of the driver bit 2 is provided. The setting unit 110 is an example of the setting means, and is configured so that a plurality of setting values can be selected or any setting value can be selected steplessly. As shown in FIG. 10A, for example, the setting unit 110 has a configuration where a setting value is selected by a rotary dial.

Among methods of providing a dedicated setting means for setting the amount of movement (amount of advance) of the driver bit 2, in the configuration where the rotary dial described above is provided, as a means for converting an operator's operation into an electric signal, a method using a potentiometer whose resistance value changes depending on a rotation angle of a shaft to which the dial is connected, a rotary encoder configured to output a pulse corresponding to the rotation angle, or the like is considered. The control unit 100 is configured to read these voltage values and the number of pulses, and to set the number of rotations (amount of rotation) of the bit moving motor 50 that determines the amount of movement (amount of advance) of the driver bit 2.

When both the contact switch part 84 configured to be pushed and actuated by the contact arm 82 and the trigger switch part 90 configured to be actuated by the operation of the trigger 9 become on and a condition for starting screw fastening is satisfied, the bit moving motor 50 is rotated by a set amount of rotation with the standby position P1, which is an initial position of the driver bit 2, as a starting point, and is then stopped or reversely rotated to control the actuation end position P2 and to adjust a fastening depth.

Further, as shown in FIG. 10B, the setting unit 110 may be configured such that a setting value is selected by a button. In a method using a switch that is actuated by pressing, such as a button, for example, a method is considered in which a plurality of, in the present example, two tact switches (momentary switches) are used, and the number of rotations (amount of rotation) of the bit moving motor 50 is set according to the pressed switch. According to this method, once the power supply of the tool body is cut off, the previous setting value becomes unclear when the power supply is turned on next time. Therefore, it is also considered to store the setting value by using a storage element such as an EEPROM.

The setting unit 110 may also be a lever-type switch or a touch panel. In addition, the setting unit 110 may be a combination of a plurality of setting means, and may be, for example, a combination of the dial method and the switch method described above. In this case, a fastening amount may be adjusted by a dial operation, and the fastening amount may be set deep by operating the switch when oblique striking such as temporary corner striking is required.

Further, the setting unit 110 may have a configuration of displaying a selected setting value by a method of indicating a current value with a label, a stamp or the like, a method of indicating a current value with an LED or the like, or the like so that the operator can easily perceive the current setting value. Note that, in order to prevent erroneous determination of the setting due to noise or the like, a setting signal may be detected only when the bit moving motor 50 is stopped. In addition, since it is also considered that the potentiometer will show an abnormal voltage outside a normal operating range due to a failure, it is also considered not to adopt an abnormal value, or to notify the operator that the failure has occurred by using an LED, a buzzer or the like.

In a configuration where the amount of advance of the driver bit 2 is adjusted by a mechanical configuration such as moving a position of a stopper, a setting unit for moving the position of the stopper may be provided near the nose unit 8. In contrast, according to the fastening tool 1 of the present embodiment, the amount of rotation of the bit moving motor 50 can be controlled to electrically control the amount of movement (amount of advance) of the driver bit 2. For this reason, there are few restrictions on the position where the setting unit 110 is provided. Therefore, in the examples of FIGS. 10A and 10B, the setting unit 110 is provided on one side of the battery attaching part 13 provided at the lower part of the handle 11. Note that, when the handle 11 is gripped with a right hand, the setting unit 110 is operated by a left hand. Therefore, the setting unit 110 may be provided on the left side of the battery attaching part 13.

Figure 13:
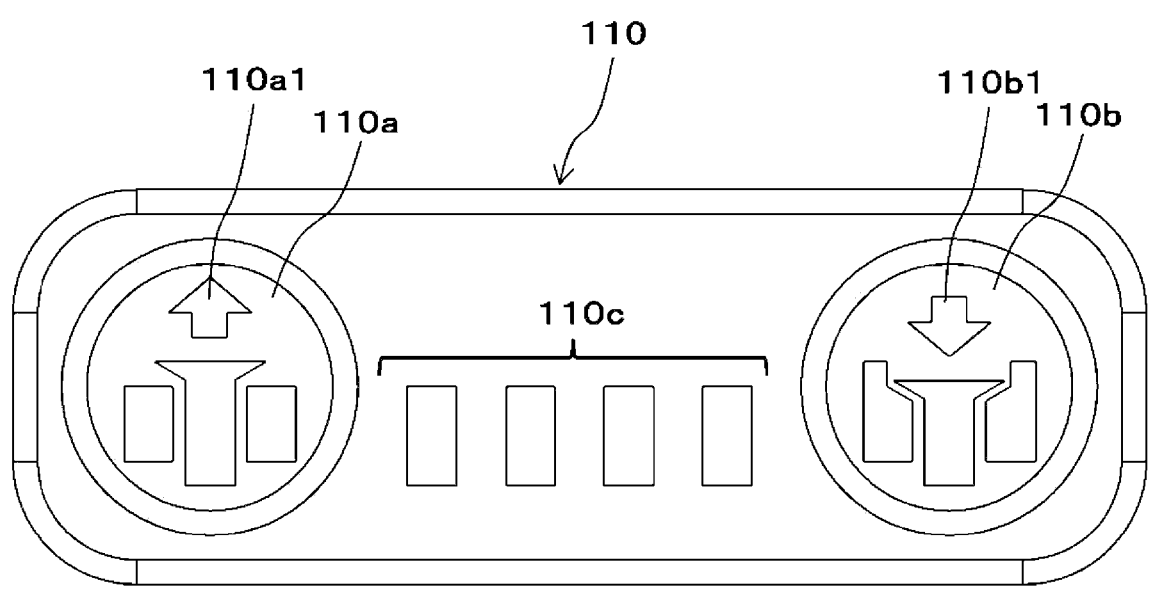
FIG. 13 is a plan view showing an example of a setting unit.

FIG. 13 is a plan view showing an example of a setting unit. The setting unit 110 shown in FIG. 13 is provided to the fastening tool 1 shown in FIG. 10B, and has a button 110a for selecting a setting value for gradually reducing the amount of advance of the driver bit 2 and a button 110b for selecting a setting value for gradually increasing the amount of advance of the driver bit 2.

In addition, the setting unit 110 includes a guide diagram 110a1 so that the setting value selected by an operation on the button 110a can be visually recognized. The guide diagram 110a1 may be provided on the button 110a or may be provided near the button 110*a*. Similarly, the setting unit 110 includes a guide diagram 110*b*1 so that the setting value selected by an operation on the button 110*b* can be visually recognized. The guide diagram 110*b*1 may be provided on the button 110*b* or may be provided near the button 110*b*.

Further, the setting unit 110 includes a lamp 110*c* configured to display a selected setting value. The lamp 110*c* is an example of the display unit, and is configured to display a selected setting value by a number of lightings of a plurality of lamps 110*c*. For example, when reducing the amount of advance of the driver bit 2, the number of the lamps 110*c* to be turned on is reduced, and when increasing the amount of advance of the driver bit 2, the number of lamps 110*c* to be turned on is increased. Further, the change may be made according to the color of the lamp 110*c* and the setting value.

In order to set the amount of movement (amount of advance) of the driver bit 2, the contact switch part 84 or the trigger switch part 90 may be used as the setting means, in addition to the method of providing the dedicated setting means. In a method using the existing operating means such as the contact switch part 84 and the trigger switch part 90 as the setting means, a predetermined setting operation different from the operation of executing a usual fastening operation is performed for the contact arm 82 and the trigger 9, so that the number of rotations (amount of rotation) of the bit moving motor 50 can be set. For example, when a continuous operation of pulling and releasing the trigger 9 is performed a predetermined number of times within a predetermined time without actuating the contact arm 82, it is determined that the operation is a setting operation of setting the number of rotations (amount of rotation) of the bit moving motor 50. Specifically, it is considered to adjust a fastening depth stepwise each time a predetermined operation is repeated such as quickly operating only the trigger 9 three times.

In the method using the existing operating means such as the contact switch part 84 and the trigger switch part 90 as the setting means, another operation means and setting means for adjusting the fastening amount are not required, so that the tool body can be downsized and the cost can be reduced.

Figure 14:
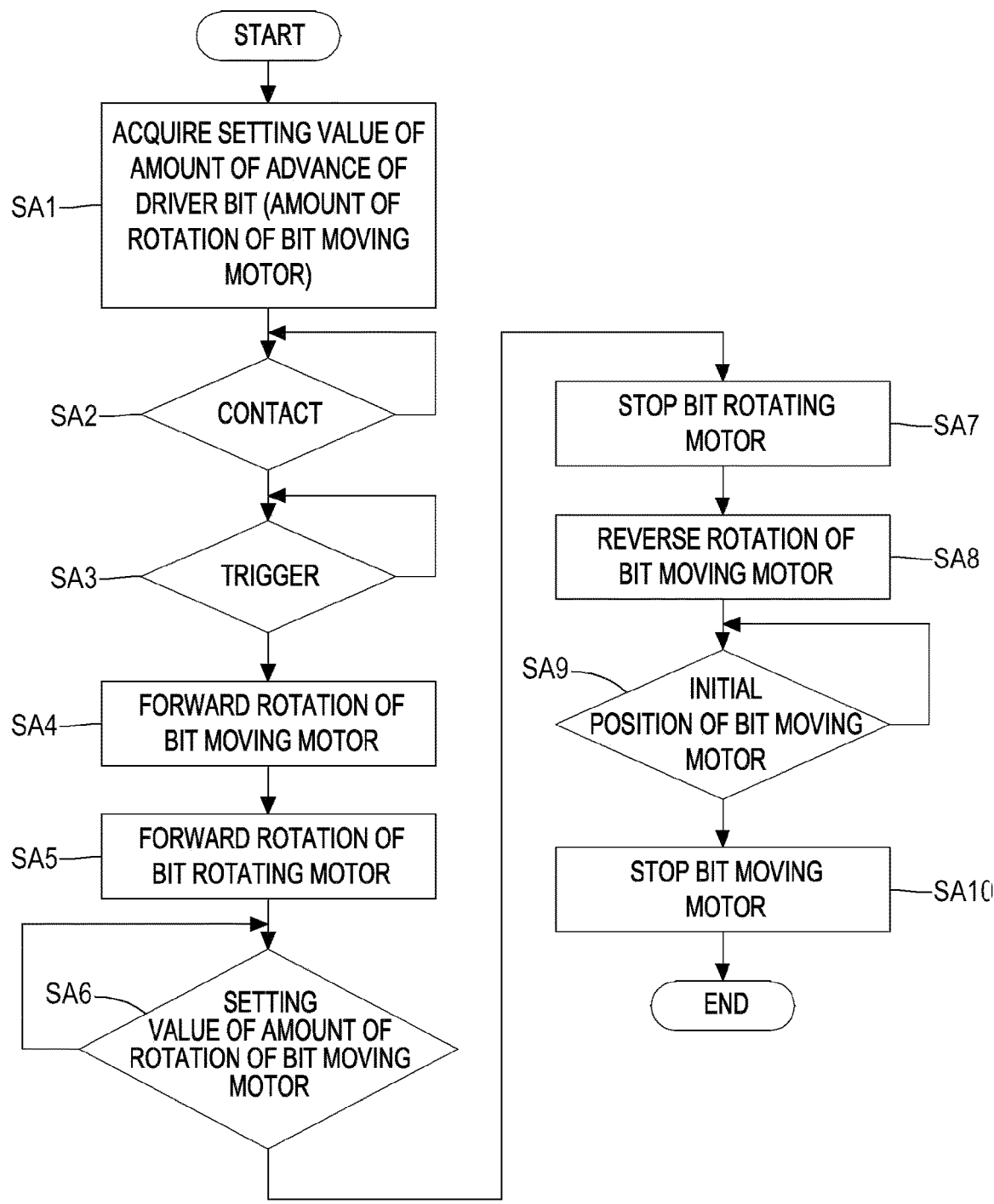
FIG. 14 is a flowchart showing an operation example of the fastening tool according to the modified embodiment of the present embodiment.

FIG. 14 is a flowchart showing an operation example of the fastening tool according to a modified embodiment of the present embodiment. Subsequently, an operation of setting an amount of advance of the driver bit 2 and performing fastening is described with reference to each drawing.

In step SA1 of FIG. 14, the control unit 100 sets an amount of rotation of the bit moving motor 50 that defines an amount of advance of the driver bit 2, based on a setting value selected by the setting unit 110. When the contact member 81 is pressed against the fastening target, the contact switch part 84 is pushed by the contact arm 82, the contact switch part 84 becomes on in step SA2, the trigger 9 is operated and the trigger switch part 90 becomes on in step SA3, the control unit 100 drives the bit moving motor 50 of the second drive unit 5 in step SA4 and also drives the bit rotating motor 40 of the first drive unit 4 in step SA5.

When the bit moving motor 50 is driven and rotates in the positive direction, which is one direction, the moving member 32 connected to the pulley 52 by the wire 54 and the holding member 30 connected to the moving member 32 move forward along the axis direction of the driver bit 2, along the rotation guide member 31.

Thereby, the driver bit 2 held by the holding member 30 moves forward, engages with the screw 200 supplied to the ejection port 80 of the nose unit 8, moves the screw 200 forward and presses the same against the fastening target.

In addition, when the bit rotating motor 40 is driven and rotates in the positive direction, which is one direction, the holding member 30 rotates together with the rotation guide member 31.

Thereby, the driver bit 2 held by the holding member 30 rotates the screw 200 in the positive direction (clockwise direction) and screws the same into the fastening target. The control unit 100 moves forward the driver bit 2 by the first drive unit 4 to make the driver bit 2 to follow the screw to be screwed into the fastening target, based on a load applied to the bit rotating motor 40, the number of rotations of the bit rotating motor 40, a load applied to the bit moving motor 50, the number of rotations of the bit moving motor 50, and the like, in conjunction with the operation of rotating the driver bit 2 by the first drive unit 4 to screw the screw into the fastening target.

When the amount of rotation of the bit moving motor 50 becomes the setting value selected by the setting unit 110 in step SA6 and the tip end of the driver bit 2 reaches the set actuation end position P2, the control unit 100 stops the drive of the bit rotating motor 40 in step SA7 and reversely rotates the bit moving motor 50 in step SA8.

When the bit moving motor 50 rotates in the opposite direction, which is the other direction, the wire 54 is pulled out from the pulley 52, so that the moving member 32 is pushed rearward by the urging member 33 and the moving member 32 and the holding member 30 connected to the moving member 32 move rearward along the axis direction of the driver bit 2, along the rotation guide member 31.

When the bit moving motor 50 reversely rotates to the initial position in step SA9 where the wire 54 is pulled out from the pulley 52 by a predetermined amount, the control unit 100 stops the reverse rotation of the bit moving motor 50 in step SA10.

Thereby, the driver bit 2 held by the holding member 30 moves rearward, and the tip end of the driver bit 2 returns to the standby position P1.

In the fastening tool 1, the amount of movement (amount of advance) of the driver bit 2 can be controlled by controlling the amount of rotation of the bit moving motor 50. Thereby, as compared to a configuration where the amount of advance of the driver bit 2 can be adjusted by a mechanical configuration such as moving the position of the stopper, the tip end position of the driver bit 2 can be adjusted with high accuracy with a simple configuration. Therefore, the head portion 201 of the screw 200 is prevented from floating from the fastening target 202 as shown in FIG. 12B or sinking too much into the fastening target 202 as shown in FIG. 12C, so that the so-called flush state can be achieved, as shown in FIG. 12A, and the finish after the fastening operation is neat.

FIGS. 15A to 15D are perspective views showing modified embodiments of the installation position of the setting unit. As described above, according to the fastening tool 1 of the present embodiment, the amount of rotation of the bit moving motor 50 can be controlled to electrically control the amount of movement (amount of advance) of the driver bit 2. Therefore, there are few restrictions on the position where the setting unit 110 is provided.

Figure 15A:
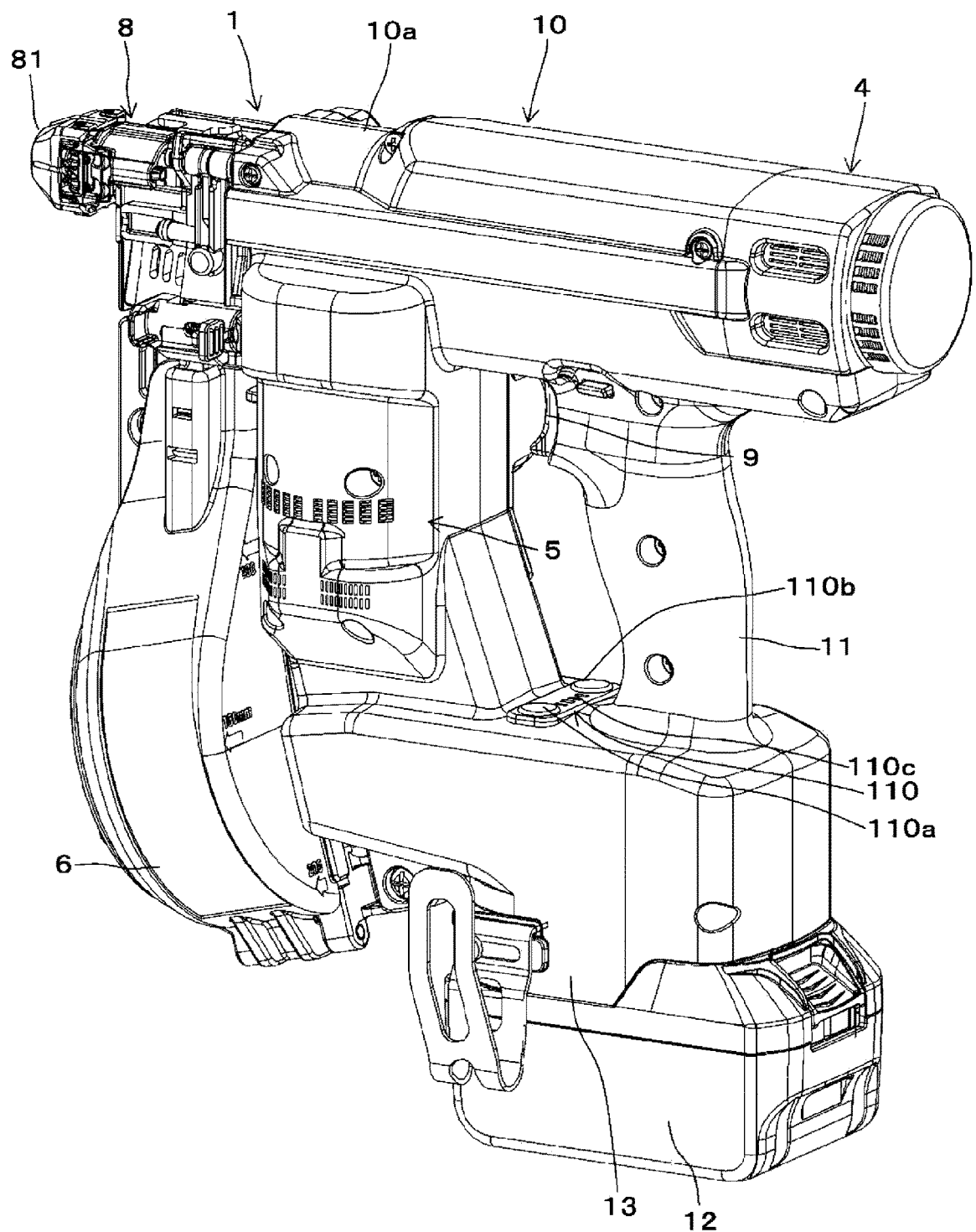
FIG. 15A is a perspective view showing a modified embodiment of an installation position of the setting unit.
Figure 15B:
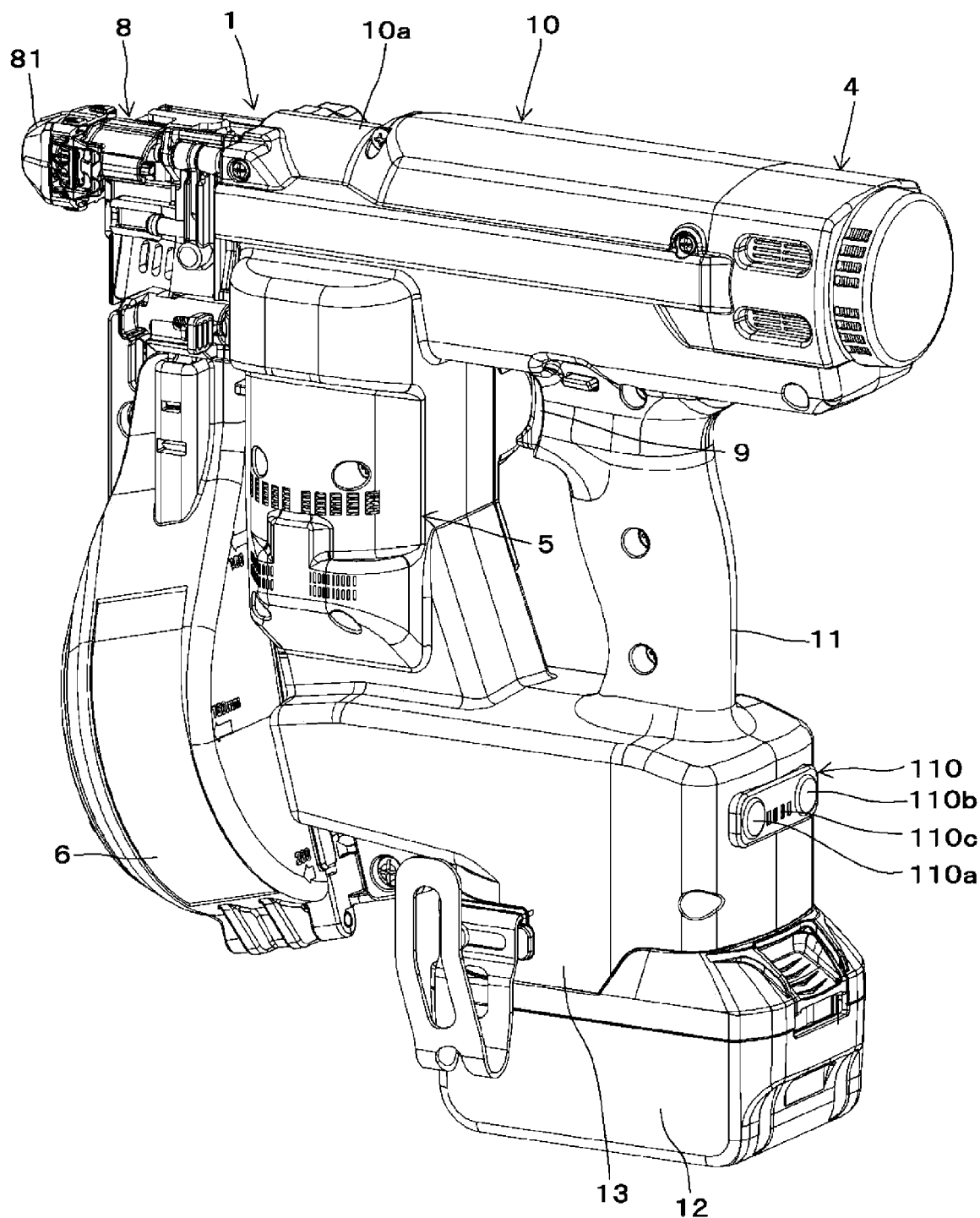
FIG. 15B is a perspective view showing a modified embodiment of the installation position of the setting unit.

Therefore, in FIG. 15A, the setting unit 110 is provided on an upper portion of the battery attaching part 13 provided at the lower part of the handle 11. In addition, in FIG. 15B, the setting unit 110 is provided at a rear portion of the battery attaching part 13. By providing the setting unit 110 near the center in the right and left direction at the upper or rear portion of the battery attaching part 13, the setting unit 110 can be operated regardless of the dominant hand gripping the handle 11.

Figure 15C:
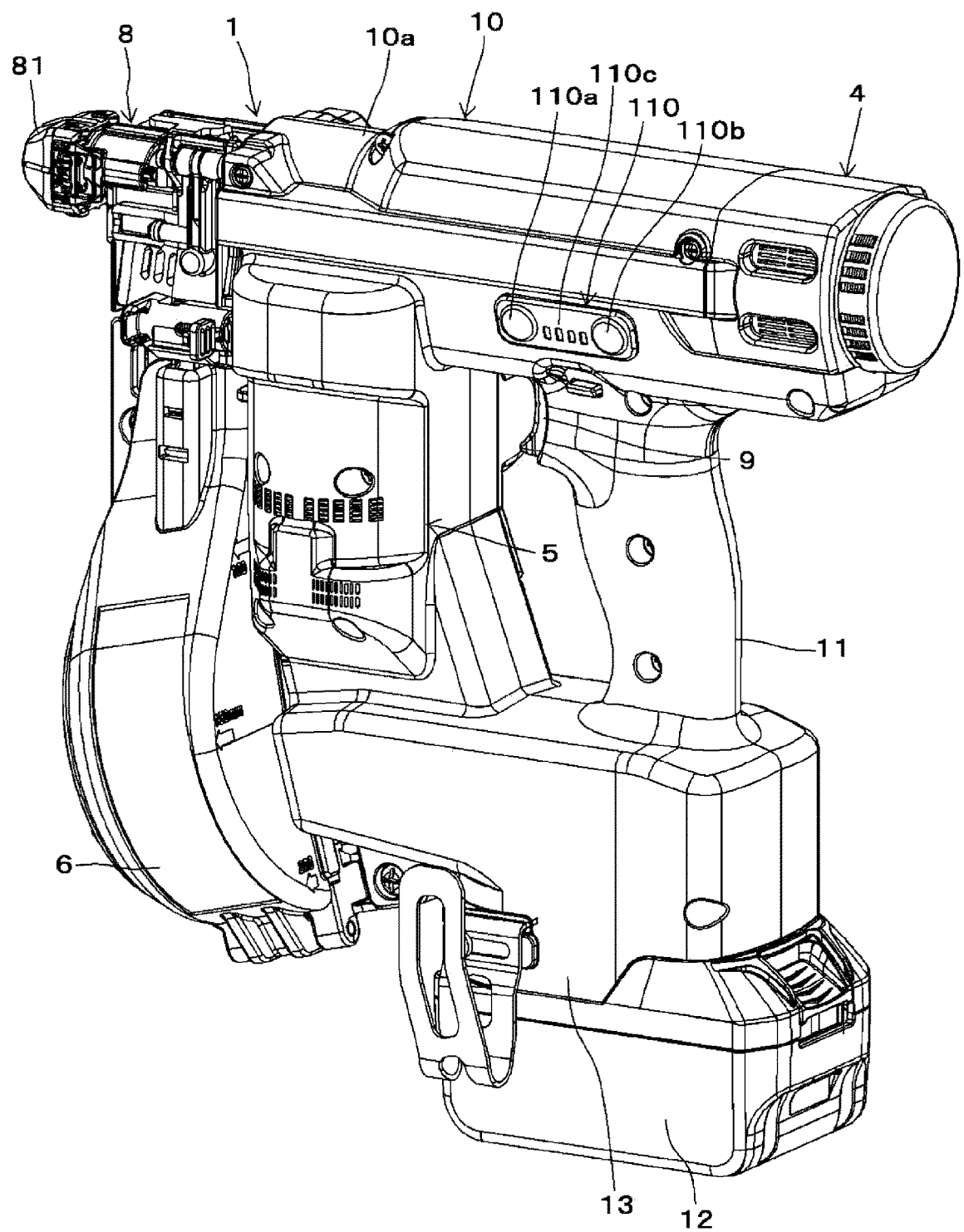
FIG. 15C is a perspective view showing a modified embodiment of the installation position of the setting unit.

Further, the setting unit 110 may be provided on the tool body 10-side, and in FIG. 15C, the setting unit 110 is provided on a side of the tool body 10. When the handle 11 is gripped with a right hand, the setting unit 110 is operated by a left hand. Therefore, the setting unit 110 may be provided on the left side of the tool body 10.

Figure 15D:
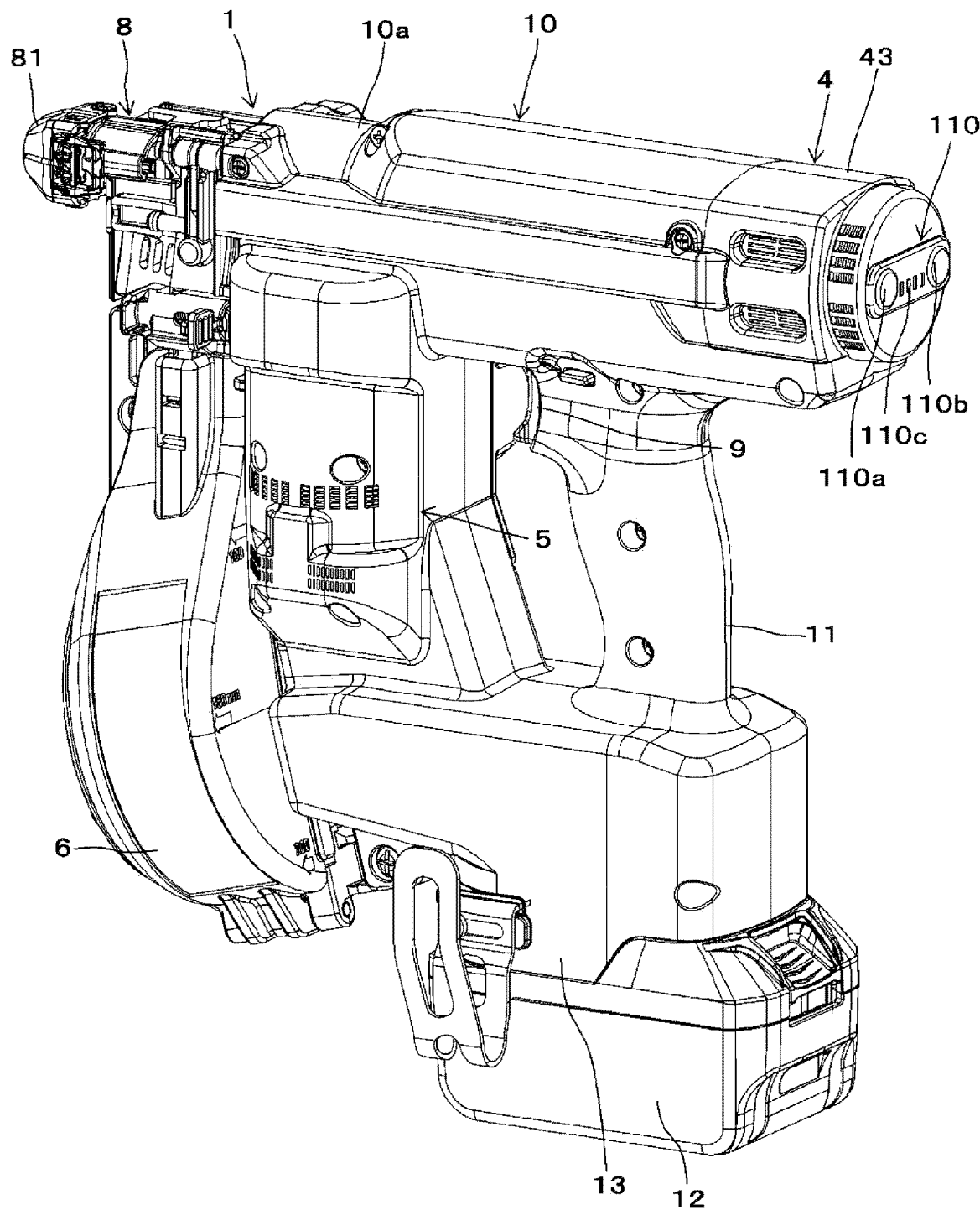
FIG. 15D is a perspective view showing a modified embodiment of the installation position of the setting unit.

Further, in FIG. 15D, the setting unit 110 is provided at a rear portion of the tool body 10, in the present example, at a rear portion of the cover part 43 that covers the first drive unit 4. By providing the setting unit 110 near the center in the right and left direction at the rear portion of the tool body 10, the setting unit 110 can be operated regardless of the dominant hand gripping the handle 11. Note that, the setting unit 110 may also be provided on an upper portion of the tool body 10.

In this way, since the amount of movement of the driver bit 2 along the axis direction can be set by an electric signal, there are few restrictions on the arrangement of the setting unit 110, and the optimization can be easily made, considering the operability of the fastening depth adjustment.

Additional Notes

This application discloses at least the following inventions (1) to (11).

(1) A fastening tool includes: a bit holding unit configured to hold a driver bit so as to be rotatable and to be movable in an axis direction; and a motor configured to move the driver bit held by the bit holding unit along the axis direction in which a screw engaged with the driver bit is pressed against a fastening target.

In the present invention, the screw engaged with the driver bit is pressed against the fastening target by a drive force of a motor that is electrically driven.

(2) The fastening tool according to (1), where the motor is a second motor, and the fastening tool further includes a first motor. The fastening tool further includes: a first drive unit having the first motor configured to rotate the driver bit held by the bit holding unit; and a second drive unit having the second motor configured to move the driver bit held by the bit holding unit along the axis direction.

In the present invention, the first drive unit configured to rotate the driver bit and the second drive unit configured to move the driver bit in a front and rear direction along the axis direction are driven by independent motors.

(3) The fastening tool according to (2), includes: a tool body extending in one direction, and a handle extending in another direction intersecting with the extension direction of the tool body. The first drive unit is provided on one side along the extension direction of the tool body with the handle interposed therebetween. The second drive unit is provided on other side along the extension direction of the tool body with the handle interposed therebetween.

(4) The fastening tool according to (2) or (3), where the first motor of the first drive unit is arranged coaxially with the driver bit held by the bit holding unit.

(5) The fastening tool according to (2) to (4), includes a transmission member configured to move the bit holding unit in a direction in which a screw engaged with the driver bit is pressed against a fastening target by a drive force of the second motor.

(6) The fastening tool according to (2) to (5), where a shaft of the second motor of the second drive unit is arranged along the extension direction of the handle.

(7) The fastening tool according to (2) to (6), where the second drive unit is configured such that a drive force of the second motor is transmitted to the bit holding unit by a pulley configured to be driven and to rotate by the second motor and a wire to be wound on the pulley.

(8) The fastening tool according to (1), includes a battery attaching part to which a battery configured to supply electricity to the motor is attached.

(9) The fastening tool according to (2) to (7), includes a battery attaching part to which a battery configured to supply electricity to the first motor and the second motor is attached.

(10) The fastening tool according to (2), where the bit holding unit and the first drive unit are configured to be detachably attached to the tool body in a state where each component is assembled.

(11) The fastening tool according to (7), where the second motor is offset to one side with respect to an axis of the driver bit so that a tangential direction of a portion of the pulley where the wire is wound approaches the axis of the driver bit held by the bit holding unit.

In the present invention, since the screw engaged with the driver bit is pressed against the fastening target by a drive force of the motor, it is possible to easily adjust excess or deficiency in force for pressing the screw against the fastening target, and to press the screw against the fastening target with an appropriate force.

In addition, in the present invention, as compared to a configuration where two operations are performed by a single drive source, a drive force transmission mechanism, a mechanism for causing the drive force to be transmitted at a predetermined timing, and the like are unnecessary, so that the configuration can be simplified. In addition, the configuration can be simplified, so that a weight can be reduced. Further, the interlocking of two operations can be performed by control.

The invention claimed is:
1. A fastening tool comprising:
a bit holding unit configured to hold a driver bit so as to be rotatable and to be movable in an axis direction;
a motor configured to move the driver bit held by the bit holding unit along the axis direction in which a screw engaged with the driver bit is pressed against a fastening target;
a tool body extending along the axis direction; and
a handle extending in another direction intersecting with the extension direction of the tool body,
wherein the motor is a second motor, and the fastening tool further includes a first motor,
wherein the fastening tool further comprises:
a first drive unit having the first motor configured to rotate the driver bit held by the bit holding unit; and
a second drive unit having the second motor configured to move the driver bit held by the bit holding unit along the axis direction,
wherein the first drive unit is disposed proximate to one side of the tool body along the extension direction of the tool body,
wherein the second drive unit is disposed proximate to another side of the tool body along the extension direction of the tool body, and wherein the first drive unit, the handle, and the second drive unit are disposed in this order along the extension direction.

2. The fastening tool according to claim 1, wherein the first motor of the first drive unit is arranged coaxially with the driver bit held by the bit holding unit.

3. The fastening tool according to claim 1, comprising a transmission member configured to move the bit holding unit in a direction in which a screw engaged with the driver bit is pressed against a fastening target by a drive force of the second motor.

4. The fastening tool according to claim 1, wherein a shaft of the second motor of the second drive unit is arranged along the other direction in which the handle extends.

5. The fastening tool according to claim 1, comprising a battery attaching part to which a battery configured to supply electricity to the motor is attached.

6. The fastening tool according to claim 1, comprising a battery attaching part to which a battery configured to supply electricity to the first motor and the second motor is attached.

7. The fastening tool according to claim 1, wherein the bit holding unit and the first drive unit are configured to be detachably attached to the tool body in a state where each component is assembled.

8. The fastening tool according to claim 1, wherein the first drive unit is provided at the rear side of the tool body and the second drive unit is provided at the front side of the tool body, with the handle at a position between the front side and the rear side of the tool body.

9. A fastening tool comprising:
a bit holding unit configured to hold a driver bit so as to be rotatable and to be movable in an axis direction;
a motor configured to move the driver bit held by the bit holding unit along the axis direction in which a screw engaged with the driver bit is pressed against a fastening target,
wherein the motor is a second motor, and the fastening tool further includes a first motor,
wherein the fastening tool further comprises:
a first drive unit having the first motor configured to rotate the driver bit held by the bit holding unit; and
a second drive unit having the second motor configured to move the driver bit held by the bit holding unit along the axis direction, and
wherein the second drive unit is configured such that a drive force of the second motor is transmitted to the bit holding unit by a pulley configured to be driven and to rotate by the second motor and a wire to be wound on the pulley.

10. The fastening tool according to claim 9, wherein the second motor is offset to one side with respect to an axis of the driver bit so that a tangential direction of a portion of the pulley where the wire is wound approaches the axis of the driver bit held by the bit holding unit.

* * * * *